United States Patent
Chao et al.

(10) Patent No.: US 8,687,147 B2
(45) Date of Patent: Apr. 1, 2014

(54) COLOR REGULATING DEVICE FOR ILLUMINATION AND APPARATUS USING THE SAME, AND METHOD OF REGULATING COLOR

(71) Applicant: Planck Co., Ltd., Taipei (TW)

(72) Inventors: Chih-Yu Chao, Taipei (TW);
Chiu-Chang Huang, Taipei (TW);
Chieh-Hsiung Kuan, Taipei (TW);
Vin-Cent Su, Taipei (TW)

(73) Assignee: Planck Co., Ltd., Taipei (TW)

(*) Notice: Subject to any disclaimer, the term of this patent is extended or adjusted under 35 U.S.C. 154(b) by 0 days.

(21) Appl. No.: 13/668,664

(22) Filed: Nov. 5, 2012

(65) Prior Publication Data

US 2013/0120688 A1    May 16, 2013

Related U.S. Application Data

(60) Provisional application No. 61/559,373, filed on Nov. 14, 2011.

(51) Int. Cl.
*G02F 1/1335*    (2006.01)

(52) U.S. Cl.
USPC .................................. 349/68; 349/8

(58) Field of Classification Search
USPC .......................... 349/77–81, 106–109, 61–68
See application file for complete search history.

(56) References Cited

U.S. PATENT DOCUMENTS

| | | | |
|---|---|---|---|
| 5,910,829 A * | 6/1999 | Shimada et al. | 349/110 |
| 6,888,608 B2 * | 5/2005 | Miyazaki et al. | 349/156 |
| 7,223,005 B2 * | 5/2007 | Lamb et al. | 362/615 |
| 7,821,611 B2 * | 10/2010 | Uehara et al. | 349/153 |
| 8,310,610 B2 * | 11/2012 | Kim et al. | 349/40 |
| 2013/0120678 A1 * | 5/2013 | Chao et al. | 349/34 |

FOREIGN PATENT DOCUMENTS

| | | |
|---|---|---|
| JP | 2006-303373 | 11/2006 |
| JP | 2007-087995 | 4/2007 |
| JP | 2007-318050 | 12/2007 |
| JP | 2010-027586 | 2/2010 |
| JP | 2010530125 A | 9/2010 |
| WO | 2010035176 A1 | 4/2010 |
| WO | 2011114253 A1 | 9/2011 |

\* cited by examiner

*Primary Examiner* — Dung Nguyen
(74) *Attorney, Agent, or Firm* — CKC & Partners Co., Ltd.

(57) ABSTRACT

There is provided a color-regulating device for illumination. The color-regulating device includes a light-valving structure for adjusting a flux ratio of outgoing light through the light-valving structure to incident light entering the light-valving structure, and a color-adjusting structure having a wavelength-band converting element for changing incident light with a wavelength band into outgoing light with a different wavelength band through the element. Wherein, the light-valving structure and the color-adjusting structure do not overlap on the traveling path of the light emitted from the light source. Mixing the outgoing light of the light source passing through the light-valving structure with the outgoing light of the light source passing through and at least a portion thereof converted by the color-adjusting structure with a different wavelength band yields a color-adjusted light of different color temperature from that of the light source.

27 Claims, 24 Drawing Sheets

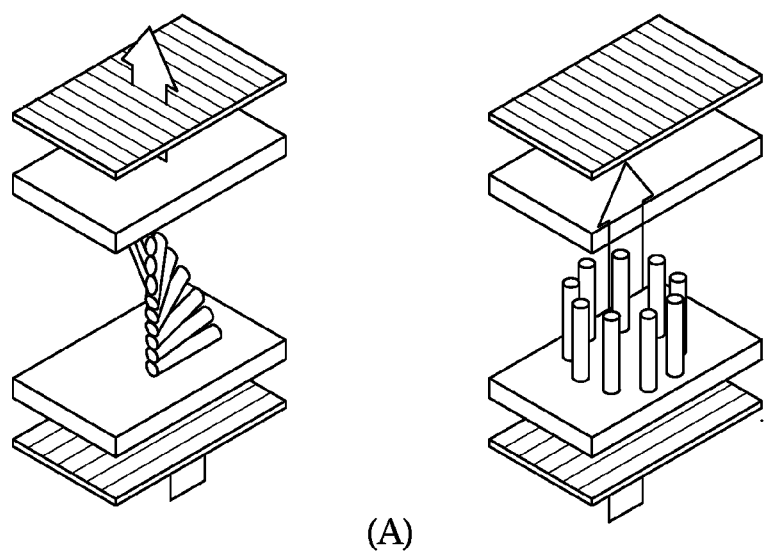
(A)
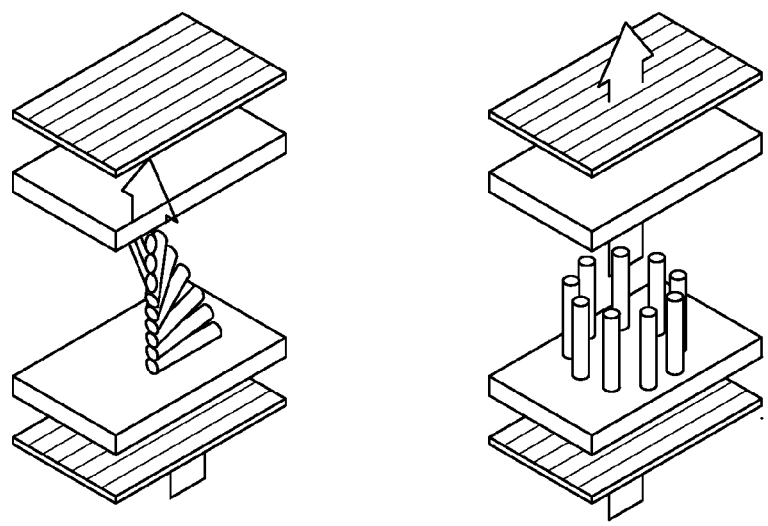
(B)
Fig. 11

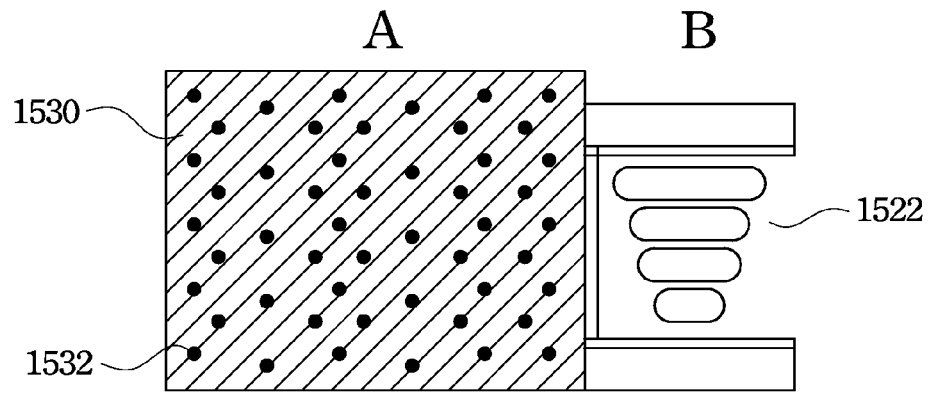
(A)
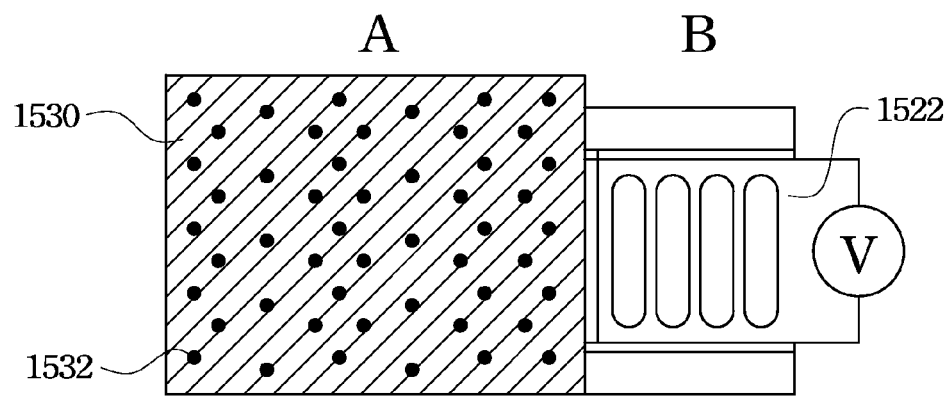
(B)
Fig. 15

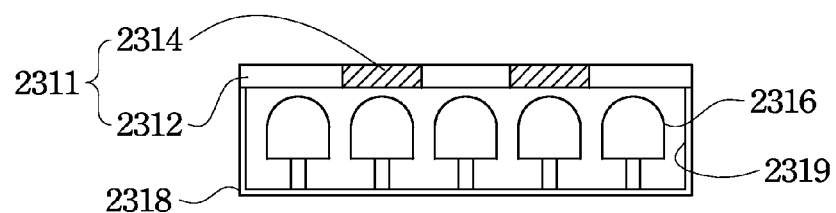
(A)
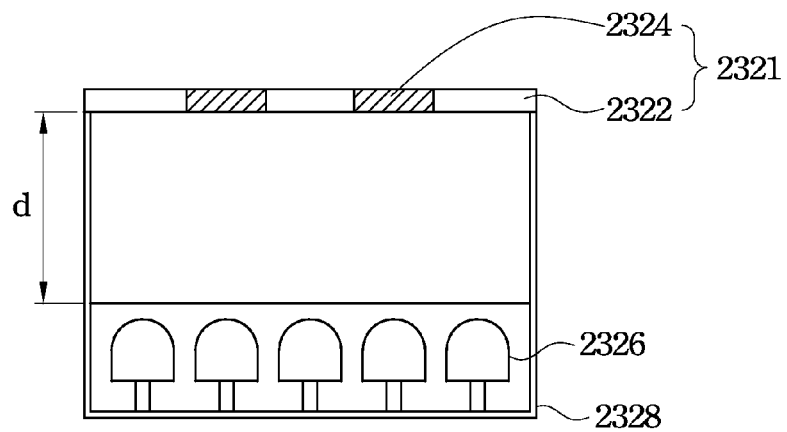
(B)
Fig. 23

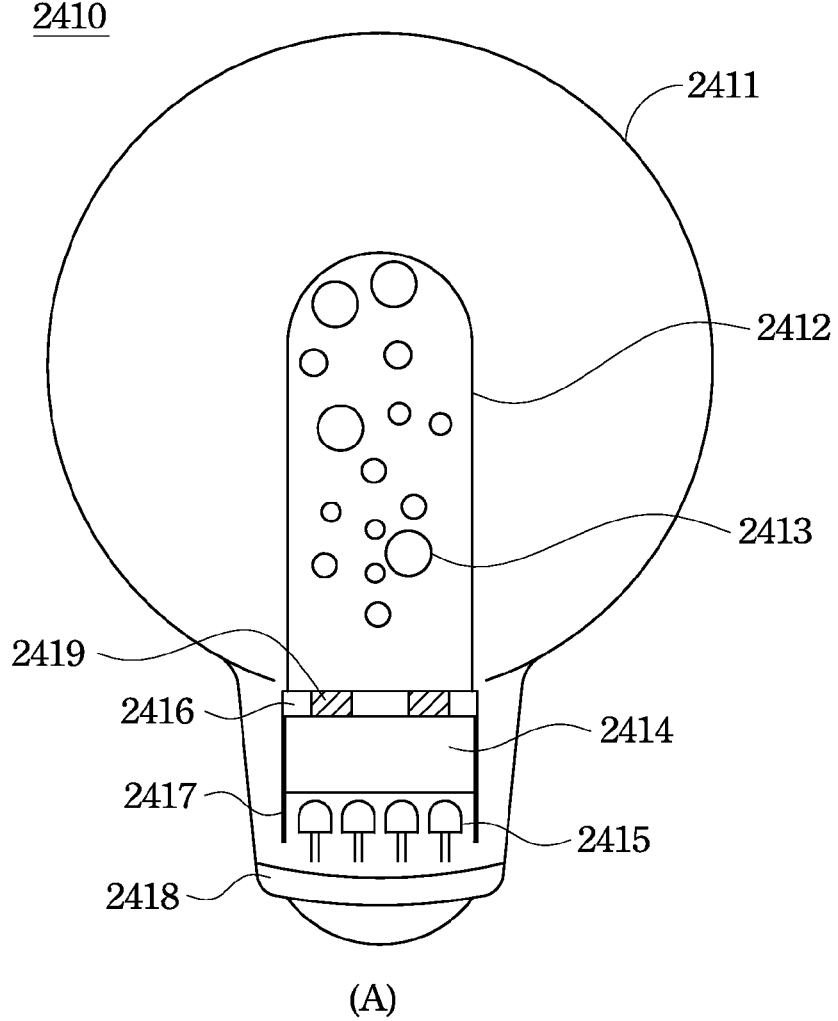
(A)
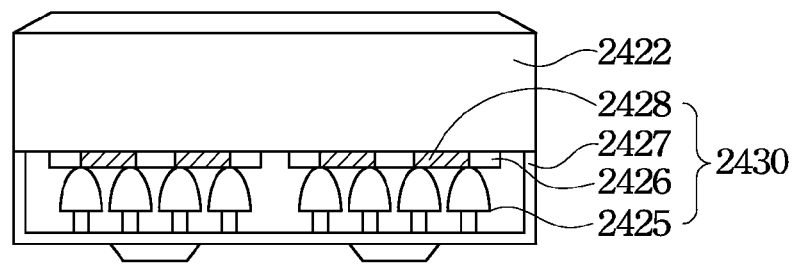
(B)
Fig. 24

COLOR REGULATING DEVICE FOR ILLUMINATION AND APPARATUS USING THE SAME, AND METHOD OF REGULATING COLOR

RELATED APPLICATIONS

This application claims priority to U.S. provisional application Ser. No. 61/559,373, filed Nov. 14, 2011, which is herein incorporated by reference.

BACKGROUND

1. Technical Field

The present invention is related to a color regulating device for illumination, a color regulating apparatus for illumination using the color regulating device, and a color regulating method.

2. Description of Related Art

Human life style has greatly changed since Edison invented incandescent lamps, and more durable, aesthetic and efficient illumination products have been advanced and developed continuously.

However, because sunlight has been adapted during the human evolution, human visual organs still favors natural illumination environment even when situated under artificial illumination. Sense of structures of human eyes to visible light changes based on variation of light wavelength and brightness of the environment. When visible light affects on human eyes to generate light sense, it is not only related to the composition and intensity of light, but also related to physiological characteristics of human visual organs and psychological factors of human. Therefore, it is necessary to evaluate visual effect generated by light radiation according to physiological characteristics of human eyes and agreed regulations through "light measurement."

Because light measurement relies on physiological characteristics of human visual organs, the Commission Internationale de l'Eclariage (CIE) unifies and sets the evaluation standard of the light sensing capability of human eye. Human eye sensitivity function $V(\lambda)$ has been set forth to connect and convert the radiation measurement and light measurement, and chromaticity diagrams are used to standardize to human eye sense of color. In 1924, CIE set forth that in an equal energy spectrum experiment of a small field of view of 2 degree, eye sensitivity function of a point light source under a photopic vision condition is called CIE 1931 eye sensitivity function and is relied to derive a CIE 1931 color space chromaticity diagram, as shown in FIG. 1. Because human eye has different light vision performance under different wavelengths, CIE, according to the human eye sensitivity to blue and indigo spectrum zones, sets forth CIE 1978 eye sensitivity function in 1978. This corrected function has higher responded value in the spectrum zone with wavelength being lower than 460 nm. However, although the CIE 1978 eye sensitivity function is the most accurate sensitivity description, the CIE 1391 is the most used color space chromaticity diagram in the world at present.

White light is the most widely used light source in the application of illumination. Because of the characteristics of the light metamerism, many spectrum combinations can be found from the chromaticity diagram to form white light. Because the characteristic difference amount all white lights is "color temperature," the color temperature relative to the chromaticity coordinate becomes an importance parameter of describing the characteristic of white light source. "Color temperature" is the parameter of "absolute temperature of the surface of a black body" to represent a spectrum distribution of a light source when such spectrum distribution is the same of a spectrum radiated from the black body. (The black body means an object that absorbs the radiation of any wavelength falling downward to its surface at any temperature.) In summary, color temperature is an expressing manner defined according to light color variation emitted from black body radiation, and the expressing manner of the defined color employs the unit of absolute temperature Kelvin (K). When the black body is heated, the outer surface of the black body under different temperatures emits different colored light. For example, when heated to 1000K, the black body presents red, red-yellow is presented below 3000K, white is presented from about 3000K to 6500K, and white light turns a little blue over 6500K. Because "color temperature" can be simply used to describe a specific spectrum, it is used to be a standard in the illumination field.

According to temperature variation, the color temperature of the light emitted from the black body can be used to depict a locus in the chromaticity diagram. The locus of the black body radiation spectrum in the CIE 1931 color space chromaticity diagram is called "Planckian Locus" or Black Body Locus (BBL). The white light spectrum in the natural world is greatly similar to the Planckian spectrum. The locus aa' in FIG. 1 indicates the "black body locus" of the Planckian black body radiation spectrum in the CIE 1931 color space chromaticity diagram and the corresponding color of its color temperature.

In the aspect of color temperature control, for a white light illuminating lamp, different color temperatures have different application fields. For example, the color temperature below 3,300 K is called "warm light," which is close to the incandescent lamp, has more red composition and provides people with feelings of warmth, health and comfort. Therefore, warm color light is adapted suitably to families, residences, dormitories, guest houses or places with low temperatures, etc. The color temperature from 3,300 K to 5,300 K is called "cold white light." Because such light is soft, it makes people feel joyful, comfortable and peaceful. Such cold light is adapted suitably to stores, hospitals, offices, restaurants and waiting rooms, etc. Color temperature over the absolute temperature 5,300 K is called "cold light," which is most close to natural light, and is bright to make people concentrate. Such cold light is adapted suitably to offices, conference rooms, classrooms, drafting rooms, design rooms, reading rooms of libraries and display cabinets, etc. Therefore, a good white light illuminating device necessarily completes adjustment of color temperature to greatly increase its application and value.

Furthermore, to evaluate whether the white light source is close to natural light, "color rendering index" of an object under illumination also becomes an important parameter. The object under illumination of sunlight or an incandescent lamp shows so-called "true color" because the characteristics of broadband of such light sources. The level of the true color presented from the object by the light source is called "color rendering index (CRI or Ra)" to evaluate the color rendering of the light source. A standard light source is used as a reference value, and Ra thereof is 100; the rest of the light sources have Ra lower than 100. When Ra value is larger, the color rendering of the light source is better. The Ra of the incandescent lamp can reach to 98. Because human eyes evolve to adapt to daylight environment, CIE employs the black body radiation spectrum of Planckian locus as an evaluation basis. To daylight of every time phase falling into an extent at a little distance to the Planckian locus, the color rendering ratio is very high.

In the modern illumination apparatuses, the most common light sources include halogen lamps, fluorescent lamp, cold cathode fluorescent lamp (CCFL), and light emitting diodes (LEDs), etc. Once an illuminating light source is completely manufactured, both color temperature and color rendering thereof are not adjusted easily anymore. With regard to conventional illumination apparatuses, common incandescent tungsten lamps have good color rendering but short lifespan and low luminous efficiency. Halogen lamps have improved lifespan and luminous efficiency when compared with incandescent lamps but high heat and ultraviolet thereof are criticized. Furthermore, conventional illumination devices based on principles of operation of incandescent lamps are all limited by overheating and unchangeableness of color temperature and color rendering after leaving factories. With regard to CCFL, it is not eco-friendly because of contained mercury and also has problems of insufficient color rendering. Recently, LED comparatively has advantages of compact volume, excellent light emitting efficiency, long lifespan and quick operating reaction time and complies environmental protection requirements of non-radiation and non-poisonous material such mercury so that having superiority when compared with other conventional illuminating light sources.

An LED is fabricated by using semiconductor process technologies to realize an optical element based on semiconductor diodes, it converts electricity to light wave, radiation spectrum belongs to mono color light and wavelength includes infrared, visible light and ultraviolet. Because the LED is required to form illuminative white light, the wavelength spectrum needs to cross red, green and blue wavelength bands of three primary colors of light to further mix into light beam. In other words, the wavelength needs to cross 300 nm (from about 400 nm to 700 nm). However, because the energy difference of a full-width at half-maximum of the radiation spectrum of the LED is very narrow, it can only emit mono light with a mono wavelength. Since a long time ago, LED is limited by the slow development of blue light wavelength band of three primary colors, because the brightness of the emitted blue light was not good and thus it cannot achieve true color images and white light illumination.

To realize white light illumination of LED, methods used by businesses are classified into two types. The first method is to combine LED chips that emit different wavelengths. For example, combination of red, green and blue LEDs or combination of blue and yellow-green LEDs is used. Electric current regulating each LED is controlled separately and a light diffusing film layer is then applied to emitted LEDs to mix and form white light. The other method is to employ material capable of converting wavelength, such as a semiconductor, phosphor or dye to cooperate with a mono light LED to achieve the purpose of emitting white light. The matured one of such white light emitting technologies is the technology that uses phosphor to cooperate with mono light LED. In 1996, Nichia Chemical Industries, Ltd. of Japan developed to use blue $(Ga_xIn_{1-x}N)$ LED to cooperate with yttrium aluminum garnet (YAG) phosphor emitting out yellow light to form a white light source. Yellow phosphor absorbs part of blue light emitted by the blue LED and then radiates out yellow light with longer wavelength. Finally, the lights of different colors are mixed into white light. Such method only needs one group of LED chips of the same color. Another common phosphor is terbium aluminum garnet (TAG) phosphor, which has worse light emitting efficiency but exhibits better color rendering when compared with YAG. The present method, cooperating the wavelength converting material capable of converting wavelength of the mono color LED to achieve white light illumination, still cooperates blue LED with yellow YAG or TAG phosphor.

However, newly risen LED light sources still cannot replace conventional illumination apparatuses. The major cause is that all marketable LED lamp products lack the characteristic presenting a uniform color temperature so that difference of color temperature between products is inevitable. The marketable white light LEDs mostly use blue LEDs and yellow phosphor to mix color. The present blue light LED manufacturing process has gradually become mature. However, when the blue light LED cooperates with the yellow fluorescent light to mix and form white light, a bias away from a predetermined zone of color temperature happens due to the mixing of luminous flux generated from the blue light and yellow phosphor has great uncertainty so that the factory color temperature of each product cannot be controlled accurately. The causes of uncertainty include phosphor mixing ratio during manufacture, uniformity of phosphor distribution, time control of phosphor dispensing during mass production and corresponding LEDs which may have different characteristics. The present mass production of white light source by cooperating phosphor with LEDs still causes an inaccuracy of more than positive and negative 200K. However, human eyes can sense and feel the color temperature variation of a light source once the color temperature variation is more than positive and negative 100K. A more sensitive person can even become aware of color temperature difference down to 50K. Therefore, general illumination products have a tolerance reduced from 100K to 50K at present. White light LEDs are limited by many above-mentioned factors of uncertainty and the yield thereof is greatly decreased. Defective samples have no choice but sell by lowered prices.

FIG. 2 is a diagram of CIE 1931 chromaticity coordinate and color tolerance, which sets up specifications for the chromaticity of solid state lighting products for electric lamps of ANSI C78.377A of white light LEDs under different color temperatures. The intervening curve shown in FIG. 2 is part of the curvature aa', a black body locus (BBL) in FIG. 1. The edge of each small grid along the up and down direction of BBL in FIG. 2 is about 50K, which represents that chromaticity within the grid is deemed "the same color temperature" because human eyes cannot distinguish any difference from color temperatures within the same grid. A common white light source for illumination has its color temperature at least inside a certain zone of the figure. Therefore, for a present indoor light source assembled from multiple LED chips, once any of the LED chips is damaged, all of the LED chips will need to be replaced completely to achieve the uniformity of color temperatures of all light sources.

As mentioned above, most of marketable white light LEDs use blue light LED and yellow phosphor to mix colors and the disadvantage thereof is that the factory color temperature of each product cannot be controlled. The reason for failure in accurate control is that the mixing of luminous flux of from the blue light and yellow phosphor has great uncertainty. Furthermore, a specific color temperature of each batch of white light sources is completed by mixing out a specific ratio of phosphor and the ratio cannot be changed by itself after package. Such method cannot arbitrarily adjust and change color temperature of the white light source so the applicability and value of the illumination apparatuses are greatly lowered. Moreover, the light source for indoor illumination should meet the criteria of suitable brightness, cozy light field, and color consistency between space and time. However, many LED light sources in the market have the issue of the space color shift, which refers to a "yellow halo" resulting from a blue shift in the middle and yellow shift in periphery. The space color shift may render adverse effect to the human body in the case of extremely high color temperature at certain angles.

In addition, at present three colors of red, blue and green LED light source are also used. With controlling the relative intensity by circuit, a white LED light is able to be made. However, in that three colors have different decay rates (in which red LED is the fast one), a significant color shift occurs after using for a period of time. The present various light sources for illumination apparatuses or adjustment of wavelength, including LEDs, have serious problems on or cannot completely control the variation and adjustment of color temperature and color rendering. To increase the quality of light sources and the application value of products (for example, illumination), the present light source devices such as for illumination have great difficulty to overcome. Therefore, a method how to accurately adjust the spectrum distribution or wavelength band of final outgoing light is greatly valuable in applications of illumination and may be used in the other application fields that highly require the quality of light sources.

SUMMARY

One embodiment of the present invention is to provide a color regulating device for lighting, configured to regulate a color temperature of light interacting with the device, comprising a light-valving structure for adjusting a flux ratio of a first incident light to a first outgoing light of the light interacted with the light-valving structure; and a color-adjusting structure having at least one wavelength-band converting element, configured to convert a second incident light with a first wavelength band into a second outgoing light with a second wavelength band, wherein the light-valving structure and the color-adjusting structure do not overlap with each other on a traveling path of the light, such that the first outgoing light and the second outgoing light are mixed to form a hybrid light with a color temperature different from that of the light.

According to another embodiment of the present invention, the light-valving structure and the color-adjusting structure are located on a plane perpendicular to the traveling path of the light.

An embodiment of the present invention is to provide an illumination apparatus comprising: a light source and the aforementioned color regulating device for lighting.

An embodiment of the present invention is to provide a color regulating method comprising: providing a first light source for emitting a first light; providing a light-valving structure and adjusting a flux ratio of a first incident light to a first outgoing light of the first light interacted with the light-valving structure; providing a color adjusting structure having at least one wavelength-band converting element and converting a second incident light with a first wavelength band into a second outgoing light with a second wavelength band; and mixing the first outgoing light and the second outgoing light to form a hybrid light with a color temperature different from that of the first light.

BRIEF DESCRIPTION OF THE DRAWINGS

The aforementioned and other objects, features, and advantages of the present invention will be more readily understood following a review of the attached drawings and the accompanying specification and claims.

FIGS. 11A and 11B respectively show a diagram of a basic framework of a 90° twisted nematic (TN) type liquid crystal cell under NW and NB modes.

FIGS. 15A and 15B show a diagram of a color regulating device for illumination according to an embodiment of the present invention.

FIGS. 23A and 23B show color regulating apparatuses for illumination according to embodiments of the present invention.

FIGS. 24A and 24B show color regulating apparatuses for illumination according to embodiments of the present invention.

DETAILED DESCRIPTION

Figure 1:
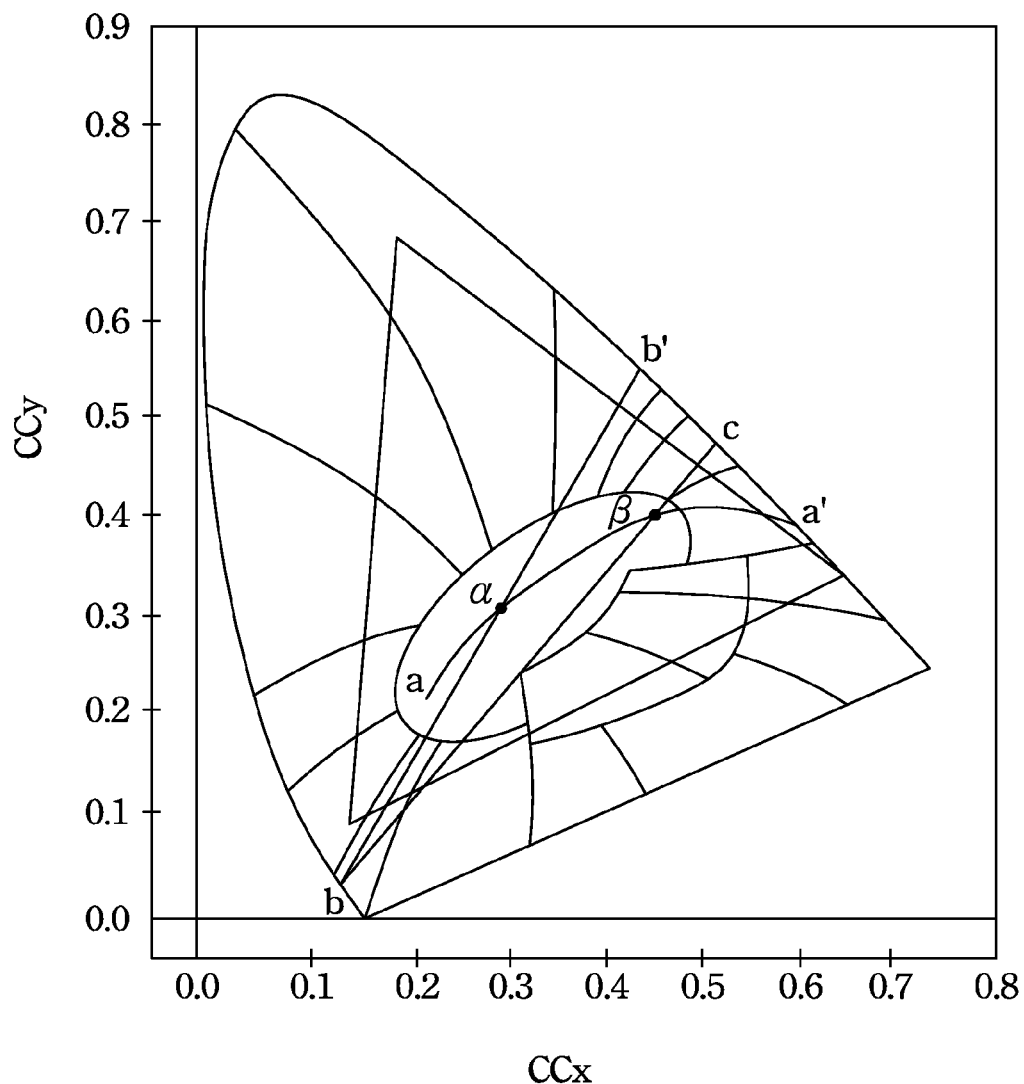
FIG. 1 shows a CIE 1931 color space chromaticity diagram containing Planckian black body locus and embodiments of regulating the chromaticity coordinate and color temperature according to the present invention.

Reference will now be made in detail to the present embodiments of the invention, examples of which are illustrated in the accompanying drawings. Wherever possible, the same reference numbers are used in the drawings and the description to refer to the same or like parts.

In the following paragraphs, multiple exemplary embodiments will be described in detail with reference to attached drawings. However, for a person of ordinary skill in the art, changes or modifications may be made without departing from the scope of the present invention. However, exemplary embodiments of the present invention will be provided to make a person of ordinary skill in the art to understand the disclosed contents of the present invention more explicitly. It is noteworthy that the present invention may be embodied by many different manners so that the exemplary embodiments should not be explained to limit the present invention. Definitely speaking, providing these embodiments makes the disclosure complete and entire, and fully indicates the scope of the present invention to a person of ordinary skill in the art. In the drawings, the shape and size for clear illustration purposes may be exaggerated, and the same reference numerals are used for showing identical or similar components across the whole of the drawings.

According to exemplary embodiments of the present invention (this disclosure), the present invention discloses a color regulating device for illumination, a color regulating method, and an apparatus using the color regulating device. In summary, a "light valve" such as liquid crystal (LC) cell or color changing glass capable of continuously adjusting the light transmission rate (ratio of incident light to outgoing light), and a color adjusting structure having patternable phosphor layer or wavelength-band converting element, are cooperated to accurately regulate color temperature to make the device and apparatus of the present invention have a "continuous" and "accurate" function of regulating color temperature of a light source. Furthermore, according to the embodiment of the present invention, using a single light source to accurately adjust the spectrum distribution or wavelength band of final outgoing light to achieve the light source effect that was only achieved by multiple light sources in the past.

So-called "accurate" adjustment of color temperature means using the color regulating device for illumination according to the present invention to control the color temperature of the mixed outgoing light for illumination within an inaccuracy of ±50K, adjust along BBL (the region of Planckian Locus) to comply with the standard of ANSI C78.377A.

The wavelength-band regulating method according to the present invention not only employs more than one phosphor to cooperate with light valving means to adjust each light flux to mix the light with desired color temperature but also uses subtraction means of wavelength band (for example, material absorbing specific wavelength band is added) to absorb specific wavelength band to lower the luminous flux so that color temperature or resultant wavelength band of light is adjusted. Furthermore, according to an embodiment of the present invention, the color-adjusting structure changes a wavelength band of incident light by an interfering means to achieve the color-adjusting structure for color adjusting purposes.

Figure 3:
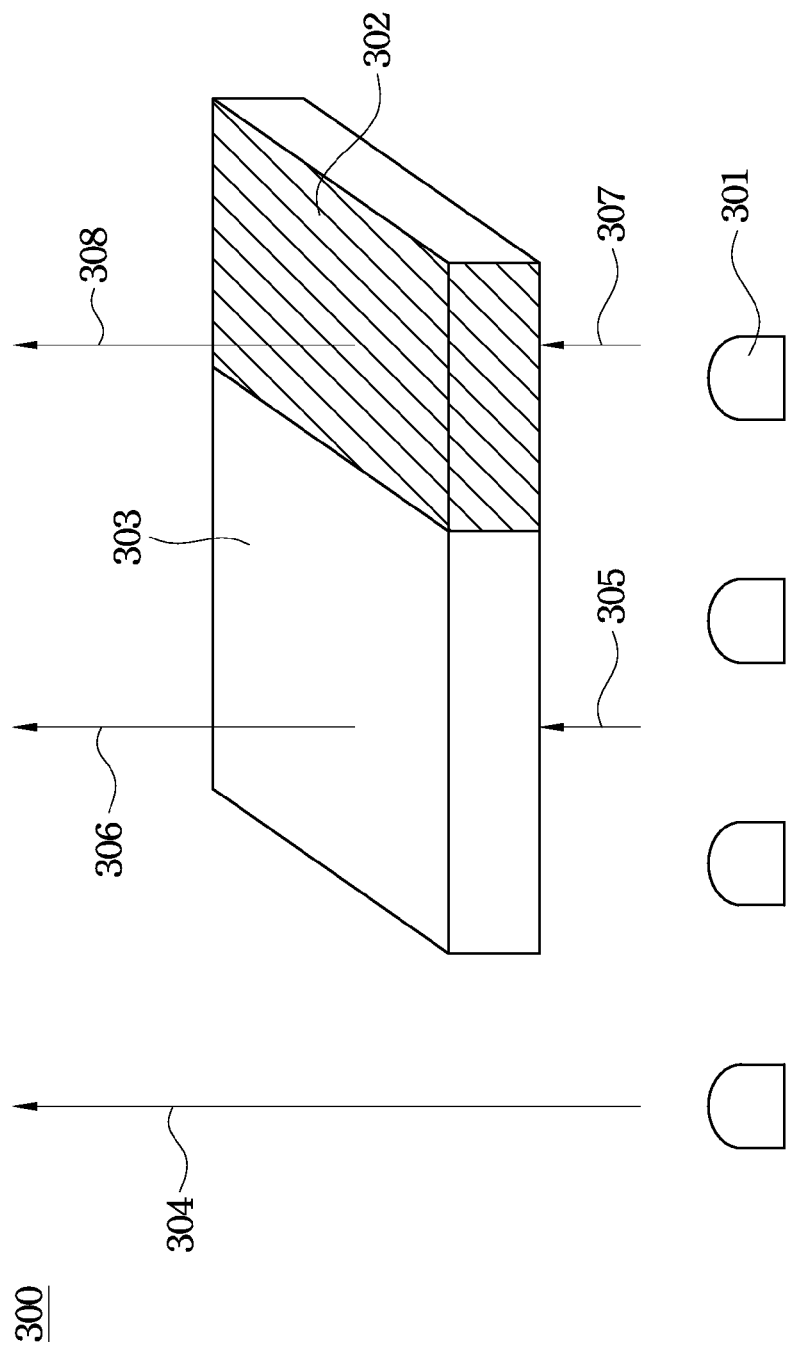
FIG. 3 shows a schematic diagram of a color regulating device for illumination according to an embodiment of the present invention.

According to the device, apparatus and method of embodiments of the present invention, as shown in FIG. 3, a color regulating device for illumination 300 comprises a light to be regulated for color temperature (emitting from a first light source 301), a light-valving structure 303, and a color-adjusting structure 302. The light-valving structure 303 and the color-adjusting structure 302 do not overlap with each other on a traveling path of the light.

As shown in FIG. 3, a part of the light emitting from the first light source 301 becomes a first incident light 305 of the light which interacts with the light-valving structure 303. After the interaction (i.e., transmitting through in the embodiment) with the light-valving structure 303, the first incident light 305 becomes a first outgoing light 306 from the light-valving structure 303. The light-valving structure 303 is employed to regulate a ratio of luminous flux of the first incident light 305 and the first outgoing light 306 of the light interacted with the light-valving structure.

In FIG. 3, another part of the light emitting from the first light source 301 becomes a second incident light 307 of the light interacted with the color-adjusting structure 302. After through the color-adjusting structure 302, the second incident light 307 turns into a second outgoing light 308 from the color-adjusting structure 302. The color-adjusting structure 302 is employed to covert the second incident light 307, which has a first wavelength band, of the light interacted with the color-adjusting structure to the second outgoing light 308 which has a second wavelength band.

At last, the first outgoing light 306 is mixed with the second outgoing 308, to form a hybrid light with a color temperature different from that of the light.

According to the device, apparatus and method of embodiments of the present invention, the second wavelength band covers the first wavelength band; that is, the second outgoing light 308 still includes a portion of the unconverted wavelength of the first light source 301. In other words, after the light from the first light source 301 entering the color-adjusting structure 302 and becoming the second incident light 307, a portion of the light is converted in wavelength band by the wavelength-band converting element of the color-adjusting structure 302, but another portion of the light remains in the wavelength band of the second incident light 307 (i.e., the wavelength band of the first light source 301). As such, the second outgoing light 308 from the color-adjusting structure 302 has the second wavelength band which is boarder than and covering the first wavelength band of the second incident light 307.

In an embodiment according to the present invention, the hybrid light mixed from the first outgoing light 306 and the second outgoing light 308 is further mixed with the original light 304 emitting from the first light source 301 but without being interacted with either the light-valving structure 303 or the color-adjusting structure 302.

Figure 4:
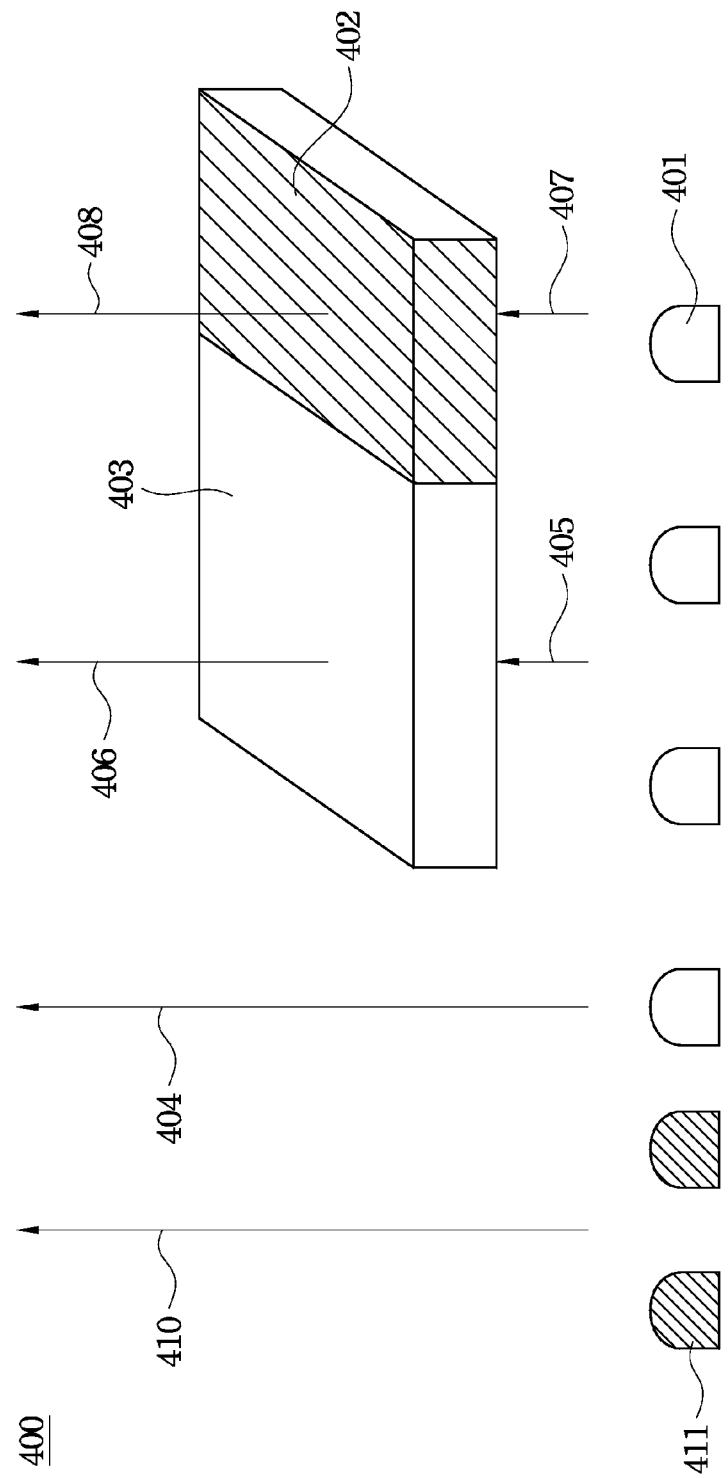
FIG. 4 shows a schematic diagram of a color regulating device for illumination according to another embodiment of the present invention.

As shown in FIG. 4, according to the device, apparatus and method of embodiments of the present invention, a color regulating device for illumination 400 further comprises a second light source 411 emitting another light 410. The another light 410 is mixed with the first outgoing light 406, the second outgoing light 408, and the original light 404 emitting from the first light source 401 but without being interacted with either the light-valving structure and the color-adjusting structure, so as to form a hybrid light having a color temperature different from that of the original light.

According to another embodiment of the present invention, the light source is a combination of a plurality of light sources with different colors, or a white light source associated a light source(s) with a single or different colors.

Figure 5:
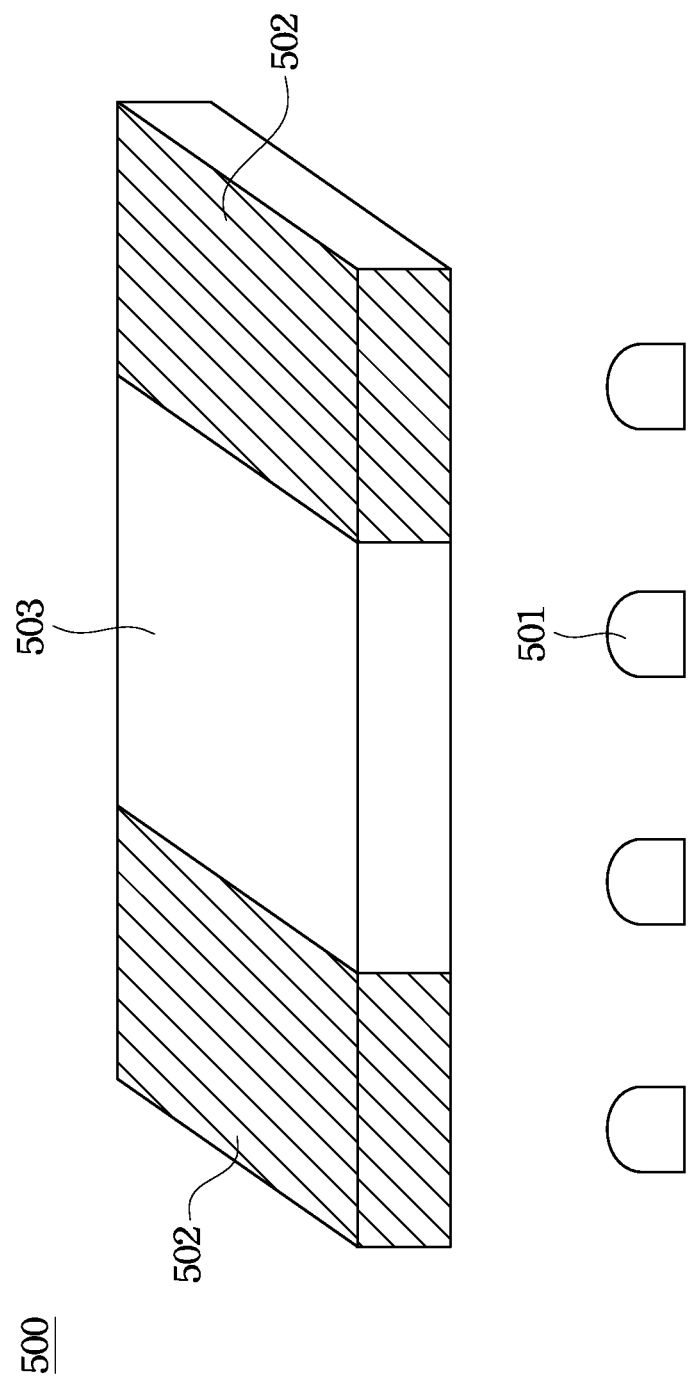
FIG. 5 shows a schematic diagram of a color regulating device for illumination according to another embodiment of the present invention.

FIG. 5 shows another embodiment of the present invention, the color-adjusting structure 502 and the light-valving structure 503 are on a plane and not overlapping at the traveling path of the light, in which the color-adjusting structure 502 locates at two sides of the light-valving structure 503, such that the light emitted from the light source 501 is converted into a first outgoing light and a second outgoing light by the light-valving structure 503 and the color-adjusting structure 502, respectively, and then the two outgoing lights are mixed to form a hybrid light having a different color temperature from that of the light.

Figure 6:
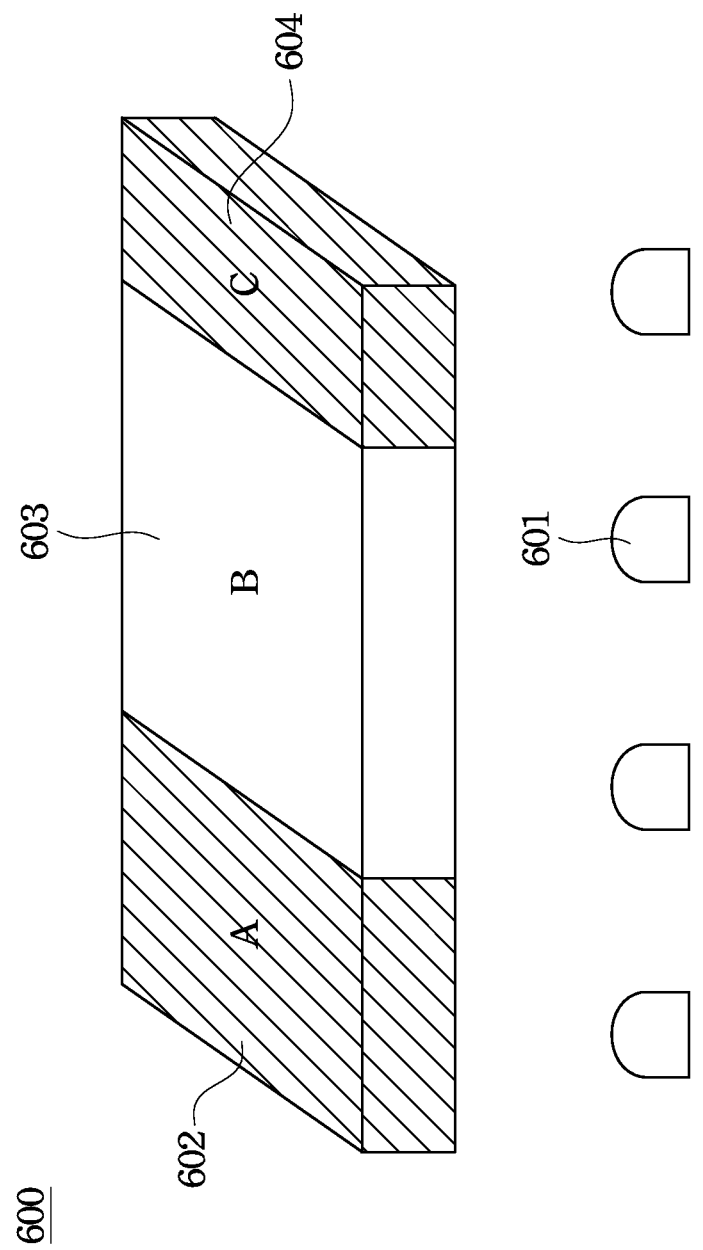
FIG. 6 shows a schematic diagram of a color regulating device for illumination according to another embodiment of the present invention.

Referring to FIG. 6, according to another embodiment of the present invention, the color regulating device comprises a light source 601, a color-adjusting structure 602 (region A), 604 (region C) and a light-valving structure 603 (region B). All the two color-adjusting structures and the light-valving structure are on a plane but not overlapping, and the region B is sandwiched between the region A and region C. It is noteworthy that the regions A and C include the color-adjusting structures with various wavelength-band converting elements, so that they can covert the light form the light source 601 entering the color-adjusting structures 602, 604 into different outgoing lights with different wavelength bands. The two outgoing lights are then mixed with the light passing through the light-valving structure 603 to form a hybrid light with a desired color temperature different from that of the light. The color-adjusting structure 604 (region C) has a luminous flux area smaller than that of the color-adjusting structure 602 (region A) for the reason that the color-adjusting structure 602 (region A) plays the main role of color adjustment, and the color-adjusting structure 604 (region C) plays the role of finely regulating the desired color temperature of the hybrid light. As a result, the present embodiment is capable of performing a fine and flexible regulation in color temperature of the hybrid light.

Figure 7:
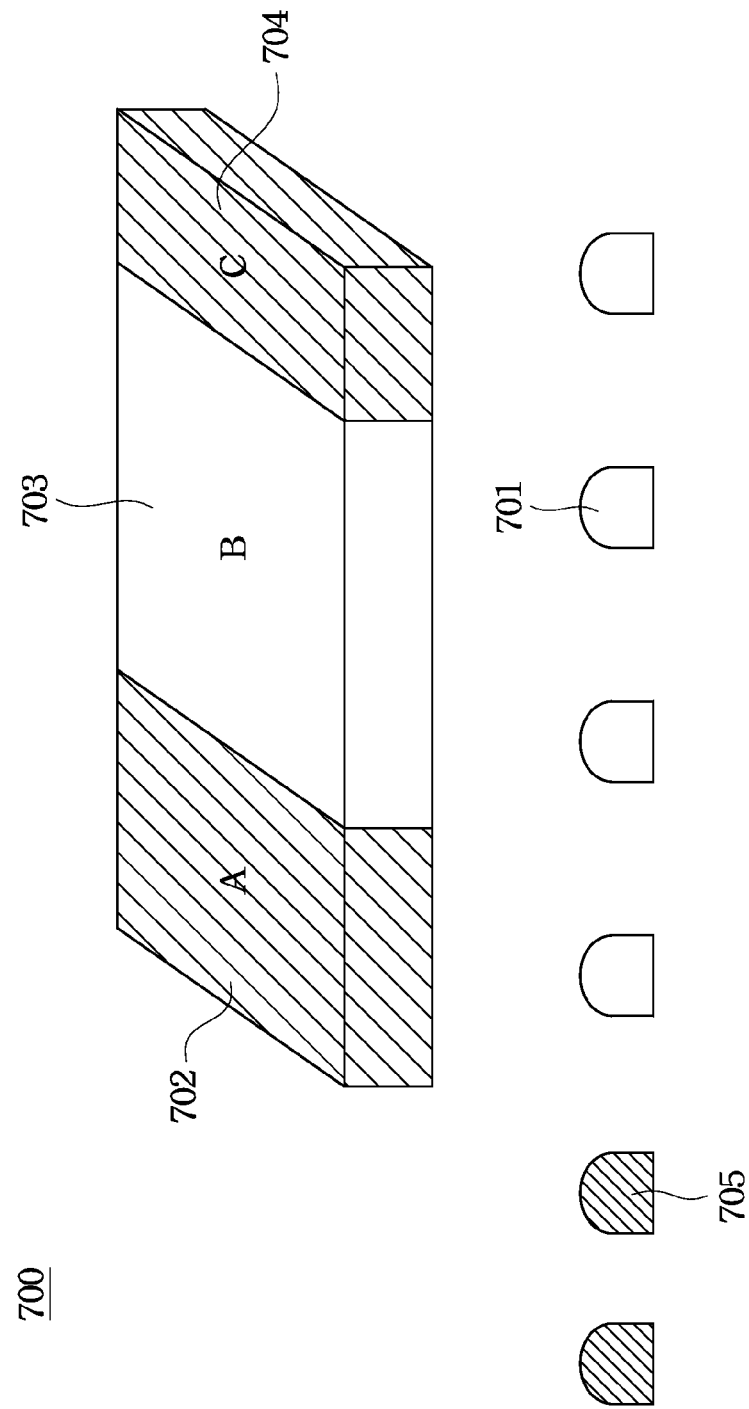
FIG. 7 shows a schematic diagram of a color regulating device for illumination according to another embodiment of the present invention.

According to an embodiment of the present invention, as shown in FIG. 7, the color regulating device further comprises a second light source 705. Therefore, in addition to the three different wavelength bands of lights from the regions A, B and C, respectively, another light directly from the second light source 705 can be further mixed therewith.

Figure 8:
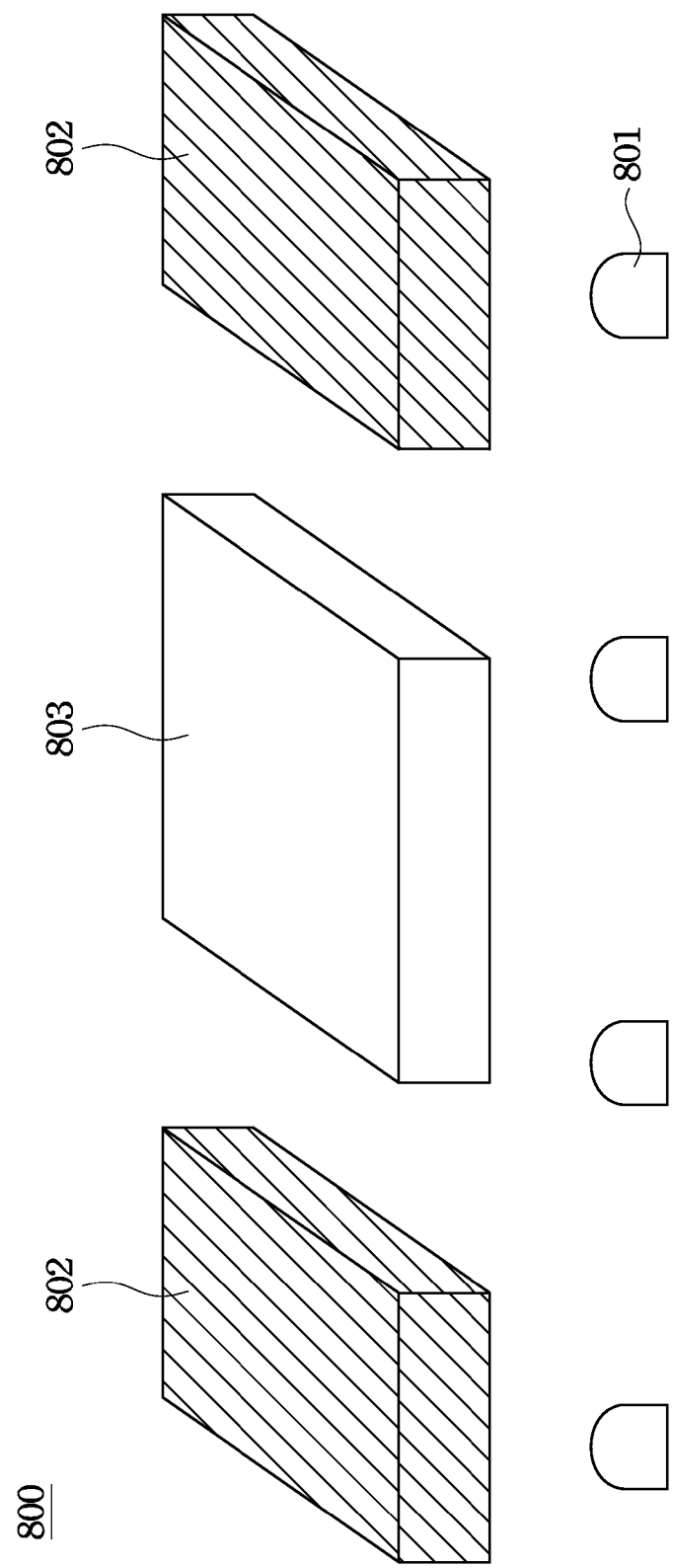
FIG. 8 shows a schematic diagram of a color regulating device for illumination according to another embodiment of the present invention.

According to an embodiment of the present invention, as shown in FIG. 8, the color regulating device comprises a light source 801, two color-adjusting structures 802 and a light-valving structure 803. The two color-adjusting structures 802 and the light-valving structure are on a plane but not overlapping with each other on the traveling path of the light, and the two color-adjusting structures 802 locate at but not abut two sides of the light-valving structure 803. Accordingly, the light from the light source 801 can be converted into a first outgoing light, two second outgoing lights by the light-valving structure 803 and the two color-adjusting structures 802, respectively. Along with the light from the light source 801 which passes between the light-valving structure 803 and the color-adjusting structures 802, all outgoing lights are mixed into a hybrid light with a color temperature different from that of the light.

Figure 9:
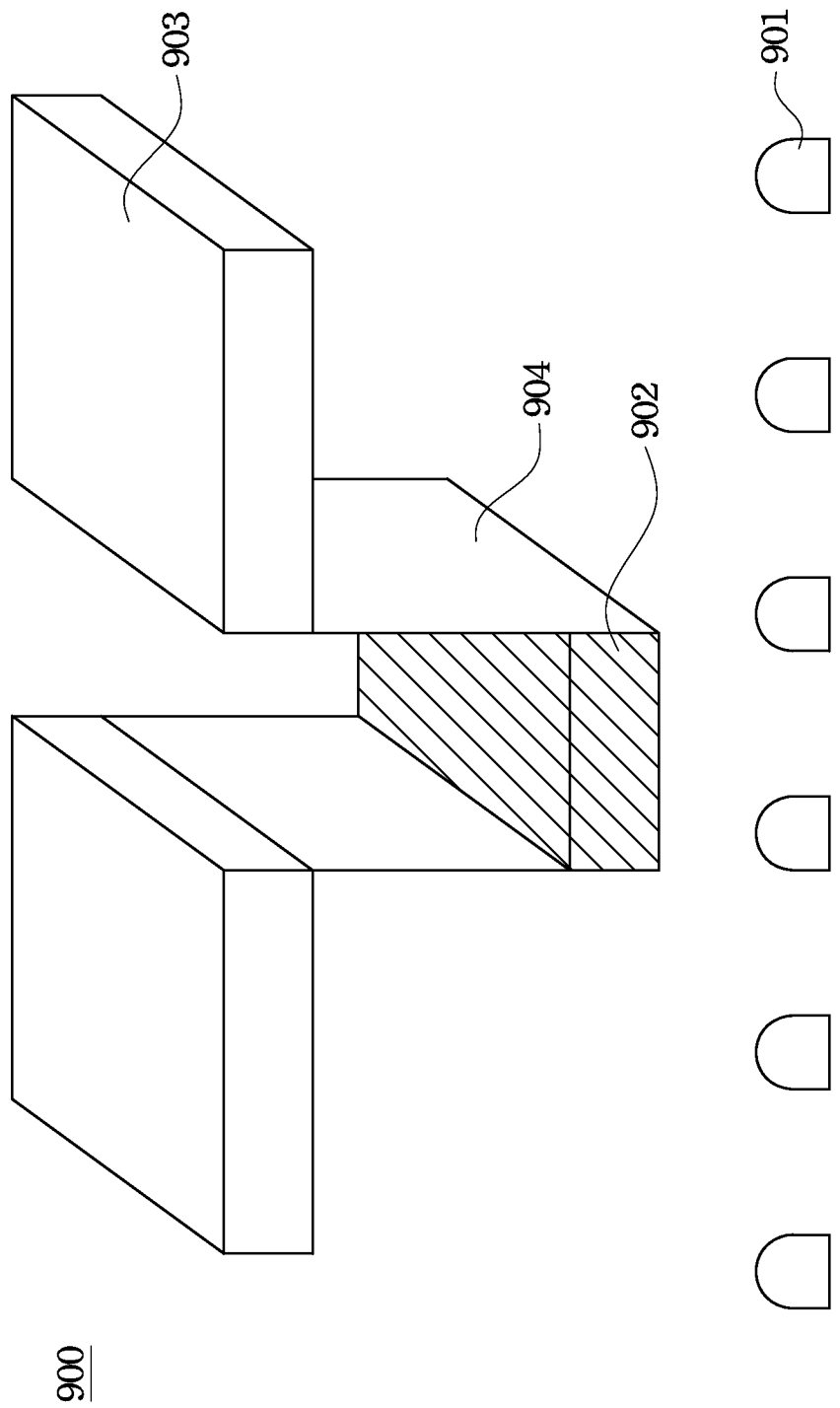
FIG. 9 shows a schematic diagram of a color regulating device for illumination according to another embodiment of the present invention.

According to another embodiment of the present invention, as shown in FIG. 9, the color regulating device comprises a light source 901, a color-adjusting structure 902, two light-valving structures 903, and two separating plates 904. The two light-valving structures 903 and the color-adjusting structure 902 are not in the same plane and do not overlap with each other on the traveling path of the light, and the two light-valving structures 903 locate at two sides of the color-adjusting structure 902. The separating plate 904 prevents the light form the light source 901 passing both of the color-adjusting structure 902 and the light-valving structures 903. Instead, the light form the light source 901 will be converted into two first outgoing lights, a second outgoing light by the two light-valving structures 903 and the color-adjusting structure 902, respectively, and then are mixed into a hybrid light with a color temperature different from that of the light.

According to embodiments of the present invention, in FIGS. 3 to 9 the positions of the light-valving structure and the color-adjusting structure relative to the light source are adjustable depending on demands. For example, the case of the light-valving structure between the color-adjusting structures and the case of the color-adjusting structure between the light-valving structures are both illustrative and applicable in the aforementioned embodiments, by simply exchanging between the light-valving structure and the color-adjusting structure in the embodiments.

According to an embodiment of the present invention, the light-valving structure is to use change of an electrically induced substance to further affect its optical properties such as transmittance and refractive index. The aforementioned change of the electrically induced substance includes but is not limited by: (1) oxidation reduction; (2) electrically induced phase transition; (3) the electrically induced change in structure or density of substance; (4) electrically induced change in hydrophility/hydrophobicity of substance. With the aforementioned change of the electrically induced substance, a control that affects quantity of transmittance, refraction and reflection of a specific spectrum region (such as a certain color) can be achieved. In other words, a light valve is able to selectively magnify or absorb a specific wavelength to serve a light-valving element for only a specific wavelength band of incident light instead of all incident light sources with other wavelength bands.

According to embodiments of the present invention, any members capable of controlling the intensity ratio of the incident/outgoing light interacted therewith in a continuous and precise manner are all potential candidates, such as a liquid crystal layer structure, a micro electro mechanical system (MEMS) assembly, an electronic paper, a piezoelectric device/material, an electrowetting element, a color changing glass or the combination thereof. The members can be configured in a three-dimensional structure.

According to an embodiment of the present invention, the light-valving structure controls the transmission ratio of incident/outgoing light through a specific area of the light-valving structure, and then the color-adjusting structure have a wavelength-band converting element accepts the incident light from the light source into the wavelength-band converting element to proceed a wavelength conversion. As such, all the outgoing lights (including a portion of the original light from a light source) are mixed so as to regulating the color temperature of an intended hybrid light. As embodiments of the present application, the wavelength-band converting element is a wavelength-band converting material or a wavelength-band converting structure unit.

According to an embodiment of the present invention, the wavelength-band converting material of the color-adjusting structure comprises a photoluminescence (PL) material.

So-called "photoluminescence (PL) material" means when such material receives electromagnetic wave irradiation (for example, blue light, ultraviolet light, laser beam, X-ray or electron beam) and absorbs light with sufficient energy, electrons acquire sufficient energy and jump to the excited state. The electrons release energy when falling down to the ground state. In case the released energy is in form of light, such process is called "photoluminescence effect."

In the aforementioned materials with PL characteristics, there are other replaceable materials except for phosphors. Basically, any material that is capable of converting incident light to outgoing light with a specific wavelength band may be used, for example: (a) fluorescent dyes with photoluminescence effects (for example, DCM, CV670, etc. (types are as shown in "Exciton" website, www.exciton.com/wavelength_chart.html)); (b) wavelength-band blocking type materials: pigments and dyes. A general dye has characteristics of completely absorbing light with a specific wavelength band so can filter off unnecessary wavelength band and leave the light with a specific wavelength band to mix with the source light. Replacing phosphors with blocking type materials causes conditions of lower light emitting efficiency but the blocking type materials are still candidates for the replacement of the phosphors of the present invention.

According to embodiments of the present invention, the phosphor is selected from the group of an oxide phosphor, an oxynitride phosphor, a nitride phosphor, a zinciferous compound phosphor, a semiconductor phosphor, an organic phosphor, a photoluminescence dye and combination thereof.

According to embodiments of the present invention, the dye is an absorption type dye, a photoluminescence type dye or the combination thereof.

Furthermore, additives in the wavelength-band converting material (e.g. phosphor material, etc.) may be quantum dots (for example, GaAs, CdSe, CdS, etc.) having photoluminescence characteristics, or may be combination of other phosphor, dye, pigment with additional quantum dots. When size of the material is smaller than a degree of 100 nm or lower, the material may be called "quantum dot" as long as the size of the material is smaller than its Fermi wavelength. Because electrons of a quantum dot are confined and dominated by the "quantum confinement effect", energy level thereof generates discontinuous states as presented in atoms. Therefore, the quantum dot is also called artificial atom. Different size generates different energy levels so that changing the size of a quantum dot will be able to change the wavelength of visible light radiated due to excitation by "electron transition", i.e. the color of light. However, because the photoluminescence effect of the quantum dot is size dependent type instead of material property, using the quantum dot as a wavelength-band converting material in indoor illumination is not efficient and the cost thereof is high. Therefore, the quantum dot can only be used for assisting color adjustment and be doped in the wavelength-band converting materials according to the present invention.

According to an embodiment of the present invention, the wavelength-band converting element of the color-adjusting structure is composed of the wavelength-band converting structure unit. In an embodiment, the wavelength-band converting structure unit comprises two thin sheets (i.e. an interference structure unit). By manipulating the gap distance between the two thin sheets, the wavelength of the incident light into the wavelength-band converting structure unit can be converted by the interference structure unit rather than the wavelength-band converting material.

According to an embodiment of the present invention, the wavelength-band converting structure unit is a member made of cholesteric liquid crystals, blue phase liquid crystals, holographic polymer-dispersed liquid crystals (H-PDLC), an electrowetting element, or a micro electro-mechanical assembly.

Basically, "parameters" that can be used for color adjustment of an exemplary embodiment of the present invention includes but is not limited by: "phosphor coating area/color ratio", "driving electrodes/phosphor relative position and their areas", "area of polarizer/relative positions and directions of polarizers/polarizer area relative to phosphor", "normally white/normally black (NW/NB)", "color of light source", etc. After each parameter is optimized, such outgoing light will be accurately adjusted between the two color temperatures of cold white and warm white light. For example, a parameter condition may be the size of region occupied by the phosphor or doping concentration and quantity. If the luminous flux of yellow light after wavelength conversion through the wavelength-band converting element is excessively high and results in that the color temperature cannot be adjusted to white light with a specific color temperature, the aforementioned phosphor parameter condition can be adjusted to change a mixing ratio of luminous fluxes of different wavelength bands so as to achieve the specific color temperature of white light.

In embodiments of the present invention, to decide to use a light source with a specific color temperature, the cooperation of colors of phosphors (a wavelength-band converting material) is referred to the CIE 1931 color space chromaticity diagram. As shown in FIG. 1, the curve in middle of the chromaticity diagram is black body locus (BBL). Such curve passes through a white light region mixed by red, green and blue primary colors. In the region, a right side region is warm white light, and a left side region is cold white light. A common white light source for illumination is valuable for illumination application only when the chromaticity coordinate thereof is located within the region. Therefore, to choose chromaticity of a light source and color of a phosphor, a connecting line between locations of the chromaticities of the light source and phosphor on the chromaticity diagram should pass through such region. If the connected line further intersects the BBL at an intersection point, we can locate the chromaticity of the mixed light right on the intersection point by adjusting intensity of the light source or intensity of the excited light of the phosphor. For example, line bb' as shown in FIG. 1 is composed of two end points of a blue LED light source (chromaticity coordinate b) having a wavelength of 450 nm cooperating with a yellow phosphor (chromaticity coordinate b') with the CIE 1931 chromaticity coordinate (CCx, CCy)=(0.4204, 0.5563). Any point on the line bb' may be acquired by mixing the light sources of the two end points with a different mixing ratio. The color temperature of the intersection point of line bb' and BBL is $\alpha$. Furthermore, line cb may be composed of two end points of the 450 nm blue light source having the chromaticity coordinate at point b cooperating with a pure yellow phosphor whose chromaticity coordinate is at point c. The color temperature of the intersection point of line cb and BBL is $\beta$, which belongs to a chromaticity coordinate of warm light. Likewise, a purple light source or green light source can be selected to change the left side end point of the above-mentioned line to further adjust the color temperature of the intersection point between the line and the BBL.

However, although the continuity of wavelength distribution on the spectrum by merely using the yellow phosphor cooperating with the blue LED to generate white light is extremely close to that of true sunlight, there is still a space between the aforementioned spectrum and the spectrum of sunlight, for which a main reason is that lack of a red light source of the three primary colors causes a space in visible light spectrum after the color lights are mixed and results in the low color rendering of the light source. At this time, using a phosphor with a second color (for example, red) (i.e. a PL material for converting at least part of incident light to outgoing light with a different wavelength band) or adopting other dye or pigment different from the yellow phosphor along with an independent light-valving structure (e.g., a LC element) in operation can make the transmitted mixed light have an additional spectrum of certain wavelength band (i.e., the third light being added) for improving color rendering of hybrid light.

In an embodiment of the present invention, the light source is selected from the groups consisting of a light emitting diode (LED), an incandescent lamp, a halogen lamp, sunlight, a cold-cathode fluorescent lamp (CCFL), fluorescent lamp and combination thereof. In addition to at least one colored light sources, a light source can also use a white light source, or use a colored light source to cooperate with a white light source. An exemplary embodiment according to the present invention accurately adjusts the light-valving structure of the color regulating device to make the color temperature of a white light source with color shift regulated into the BBL region. Likewise, with regard to a white light source (not limited in LED light sources) of which chromaticity coordinate is already known, a phosphor having a corresponding light color may be selected so that light of the white light source and light generated from the excited phosphor are mixed to form a white light within a predetermined chromaticity extent. Further, controlling the light-valving structure to change the luminous flux by the applied voltage makes the mixed light switch between the original white light and warm white light.

Figure 2:
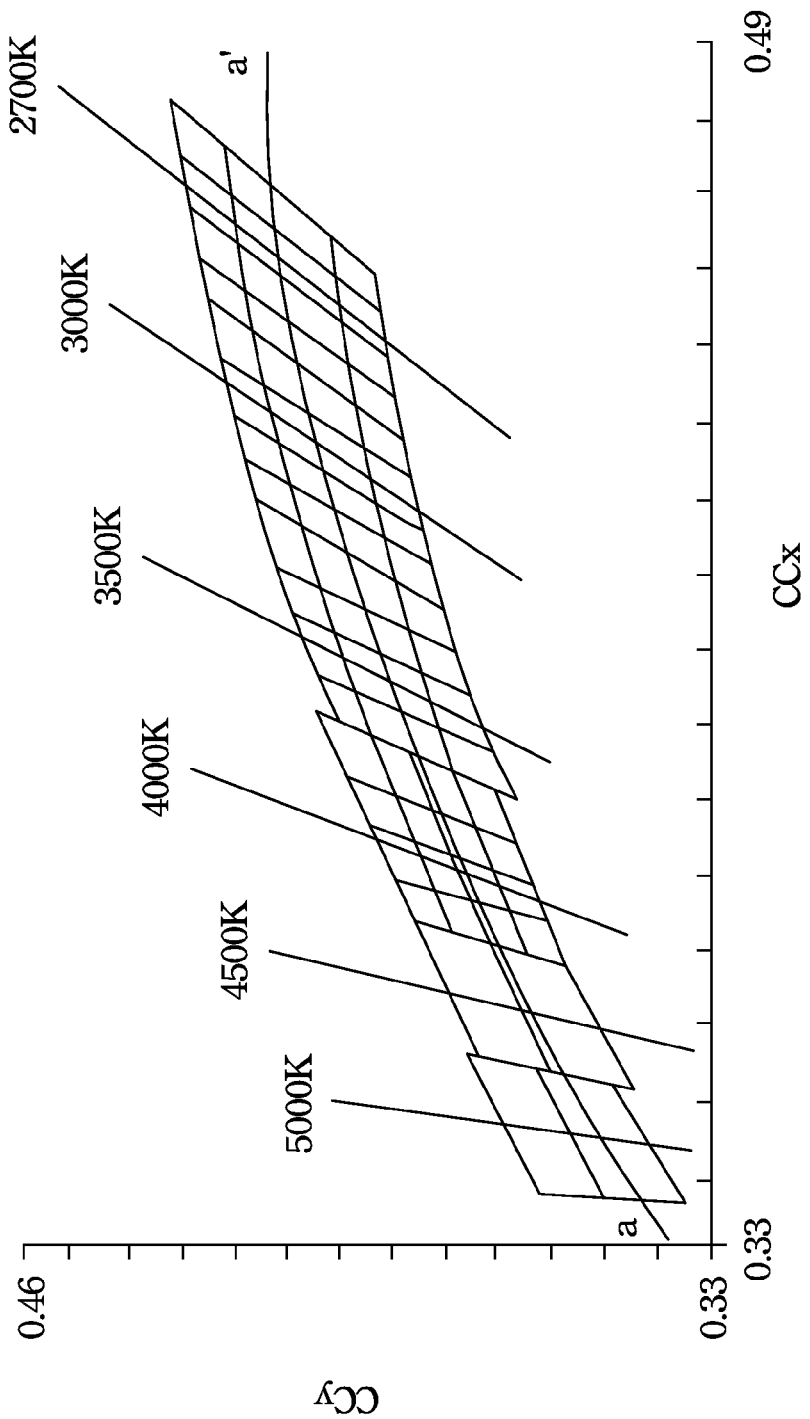
FIG. 2 is a diagram of CIE 1931 chromaticity coordinate and color tolerance, which sets up specifications for the chromaticity of solid state lighting products for electric lamps of ANSI C78.377A of white light LEDs under different color temperatures.

The light sources used in the color regulating device and color regulating method for illumination of the present invention basically may be existent conventional light sources for illumination, of which the only requirement to be fulfilled is that intensity of the light source is sufficient to make a phosphor act to convert a wavelength band of at least part of incident light to another different wavelength band of outgoing light. LED light sources are taken for example. In the current high-power LED products, except for blue light LED fabrication process that tends to mature, other color light LEDs has lower light emitting efficiency in comparison with blue light LEDs because of the unstable process thereof. Moreover, these LEDs usually have poor product yield in the process of mass production. It frequently happens that samples in the same batch of products depart from a predetermined color temperature region. Even excellent and qualified LED products, when cooperating with phosphors for mixing white light, probably depart from the predetermined color temperature region because of errors in sampling of phosphors. White light LEDs are limited by these two uncertainty factors so that the output thereof is greatly decreased. Defective products can only be sold at lower prices. However, if the color regulating device for illumination of the embodiment according to the present invention is used to adjust the white light, the aforementioned conditions will not happen. As long as a connecting line between chromaticity coordinates of LED and phosphor in the chromaticity diagram passes through a region as shown in FIG. 2, the transmittance of the liquid crystal can be controlled by fine adjusting voltage to achieve the purposes of accurately controlling the chromaticity coordinate to fall into a specific region.

In an embodiment according to the present invention, the liquid crystal layer structure serving as a light valve has at least one liquid crystal cell. So-called "liquid crystal layer structure" here has transparent electrodes situated between two light-permeable substrates, a liquid crystal layer including liquid crystal molecules, and two optional polarizers respectively attached to outsides of the light-permeable substrates. "Liquid crystal cell" means that in the liquid crystal layer a bias voltage can be applied independently to adjust an electric field through the liquid crystal layer to further change a twist and/or tilt angle of liquid crystal molecules to achieve purposes of adjusting grayscale of the liquid crystal cell.

Liquid crystals are rod-like molecules and are capable of redirecting polarization direction of light or directly blocking part of light from passing. At present, common liquid crystals generally contain threadlike liquid crystals (i.e. nematic LCs), smectic liquid crystals, ferroelectric liquid crystals, cholesteric liquid crystals (CLCs), blue phase liquid crystals, discotic liquid crystals and polymer disperse liquid crystals (PDLCs). Nematic liquid crystals are most widely used in the daily life, for example, displays.

It is diversified for using liquid crystals on current displays. Furthermore, according to different design, liquid crystal molecules may be operated by various driving modes, such as twisted nematic (TN, wherein TN liquid crystal molecules are rotated for 90 degrees or other suitable angles in practice) mode, super twisted nematic (STN, wherein liquid crystals are rotated for larger angles like 240 to 270 degrees, etc) mode, in-plane switching mode (IPS) mode, fringe field switching (FFS) mode, vertical alignment (VA) mode, multi-domain vertical alignment (MVA) mode, optically compensated bend (OCB) mode, electrically controlled birefringence (ECB) mode and axially symmetric aligned microcell (ASM) mode, etc. The most basic framework is 90° TN mode and other modes respectively provide particular advantages, for example, wide view angle, fast response time, etc.

Figure 10:
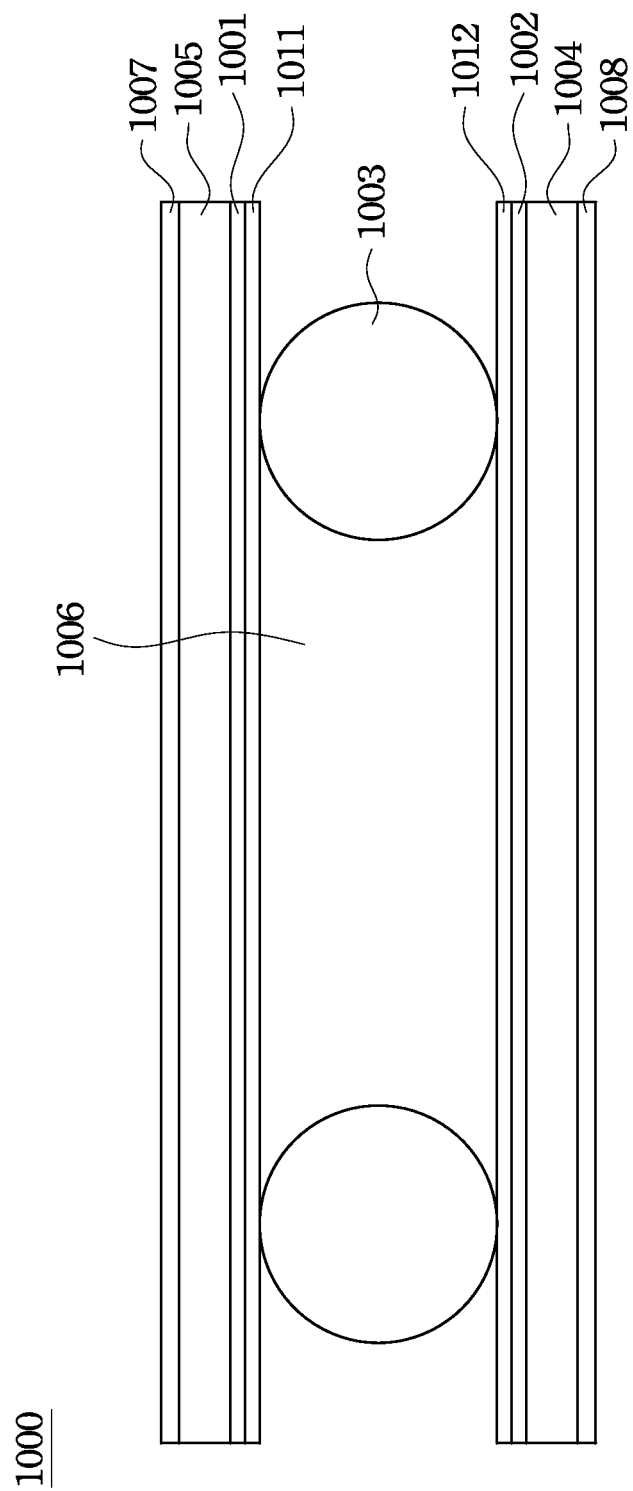
FIG. 10 shows a schematic diagram of a liquid crystal layer structure.

FIG. 10 shows a schematic diagram of a liquid crystal layer structure 1000. Opposite surfaces of two light-permeable substrates 1004, 1005 are coated with transparent conductive electrodes of indium tin oxide (ITO) 1001, 1002 for applying voltage to build an electric field between the light-permeable substrates; alignment layers 1011, 1012 are applied onto the ITOs and each alignment layer has fine grooves so that the grooves of the alignment layer are used to align liquid crystals; spacers 1003 are located between and evenly partition the two light-permeable substrates, and then the liquid crystal layer 1006 is filled with liquid crystal (LC) molecules. Subsequently, there may be differences in the use of demand, in the case of 90° TN LC mode, two polarizers 1007, 1008, two polarizing directions of which are orthogonal to each other in 90° TN liquid crystal, are attached respectively on upper and lower sides of the whole element. The relative polarizing directions of the two polarizers may change with demands in practice. When the ITO electrodes on the upper and lower light-permeable substrates are applied with adequate voltage, the electric field built in the liquid crystal cell is able to drive the liquid crystal molecules to continuously twist and tilt to correspond to the magnitude of the electric field and to be finally parallel to the direction of the electric field. After an incident light passes through the first polarizer, the light becomes a linearly polarized light which then passes through the liquid crystal molecules in the liquid crystal layer. The liquid crystals change their orientations under bias voltage, causing the polarized state of output light will be changed accordingly. Cooperating with the linear polarization effect of second polarizer, outgoing light will generate different light intensity for representing grayscale. The aforementioned is the most basic liquid crystal cell of the 90° TN framework. With such embodiment of the liquid crystal layer structure, a flux ratio of incident light to outgoing light may be adjusted for a "light valve" in a color regulating method of the present invention.

According to light-permeable state or non-light-permeable state of the liquid crystal cell without applied voltage, the operation mode of the liquid crystal cell may be classified into normally white (NW) mode and normally black (NB) mode.

FIGS. 11A and 11B show an exemplary embodiment according to the present invention. TN type liquid crystals are used to explain the basic framework of NW and NB modes and light-permeable operation mode. In FIG. 11A, the grooves of the upper alignment layer and the grooves of the lower alignment layer are perpendicular to each other, which will make the liquid crystal molecules twist for 90 degrees between such substrates to further make the polarization direction of passed polarized light to twist for about 90 degrees along the twist of the liquid crystal molecules; therefore, by arranging the upper and lower polarizers to be perpendicular to each other and arranging the alignment direction of the liquid crystals of each surface to be parallel to the corresponding polarizer, incident light can easily pass through the whole liquid crystal cell to form a light-permeable state (so-called "bright state"). A TN liquid crystal element in the light-permeable state without applied voltage is called NW TN liquid crystal element. The only difference between the NW mode and NB mode is the relative positions of the two polarizers; changing the polarization directions of the two polarizers perpendicular to each other to polarization directions paralleling to each other turns to the NB mode (as shown in FIG. 11B). If a fully light-permeable state is presented in a default status without applying voltage, light energy loss and voltage driving consumption can be reduced. However, in application, designs of NB mode liquid crystal cells can be employed depending on the actual demand.

Figure 12:
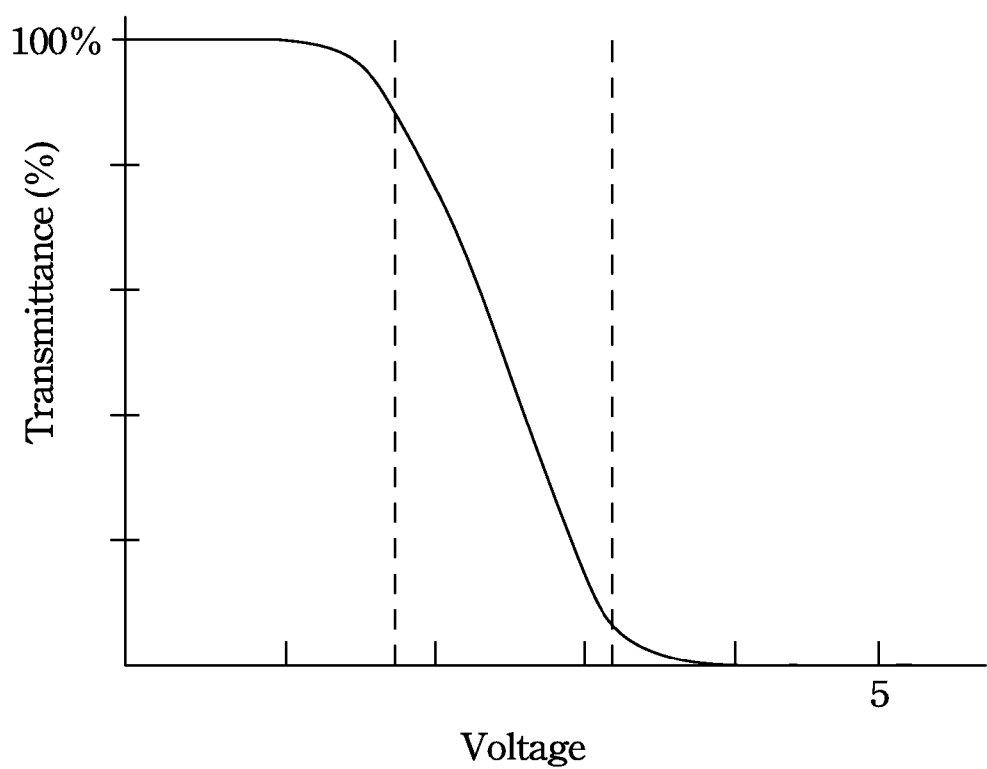
FIG. 12 shows a curve of light transmission through the liquid crystal cell versus m applied voltage.

FIG. 12 shows a curve of applied voltage value versus light transmission variation through the liquid crystal cell. Here, the magnitude of the driving voltage is only exemplified for convenience of description; the actual driving voltage will depend on liquid crystal types and species, and other relevant parameters. It shows a liquid crystal cell from a bright state to a dark state, wherein a vertical axis indicates transmittance (T %) and a horizontal axis indicates voltage (V) applied to the electrodes on the two sides. The bright state (often defined as the light transmittance >90%) is the state with an applied voltage lower than 1.75 V in the figure, and the dark state is the state with the applied voltage larger than 3.5 V. The state in grayscale (the region between two dashed lines in FIG. 12) corresponds to the extent of applied voltage from 1.75 to 3.0 V. The light is from fully bright state to fully dark state. "Fully bright" means white and "fully dark" means black so that a "continuous" transition state between the fully bright state and the fully dark state is called "grayscale." If voltage is adjusted within such extent, light transmission quantity can be continuously controlled by slightly increasing or decreasing voltage to make the liquid crystal cell as a light valve.

In another embodiment according to the present invention, as shown in FIG. 10, the two polarizers 1007, 1008 are used respectively on the outsides of the two light-permeable substrates. Besides conventional polarizers, "non-absorption type polarizers" may also be employed to lower luminous flux loss during the adjustment of light sources. The principle of non-absorption type polarizers is to use multilayer films to interfere with PE wave and PM wave (these two waves are perpendicular to each other) to make PE wave disappear and PM wave increase so that a function of polarization is achieved. The non-absorption type polarizer includes the non-absorption scattering polarizer. It defines the light transmission axis through the matching of two refractive indices of host and guest materials in polarizer, while the non-transmittance axis perpendicular to the transmission axis is produced by the refractive index mismatch of host and guest materials, thereby forming the polarization function. The incident light disappears in the non-transmittance axis due to multiple interferences and can be recovered for the reuse as incident light. In general, non-absorption type polarizers may raise brightness up to 1.5 times so that non-absorption type polarizers can be used to increase light transmittance for improving illumination efficiency.

Figure 13:
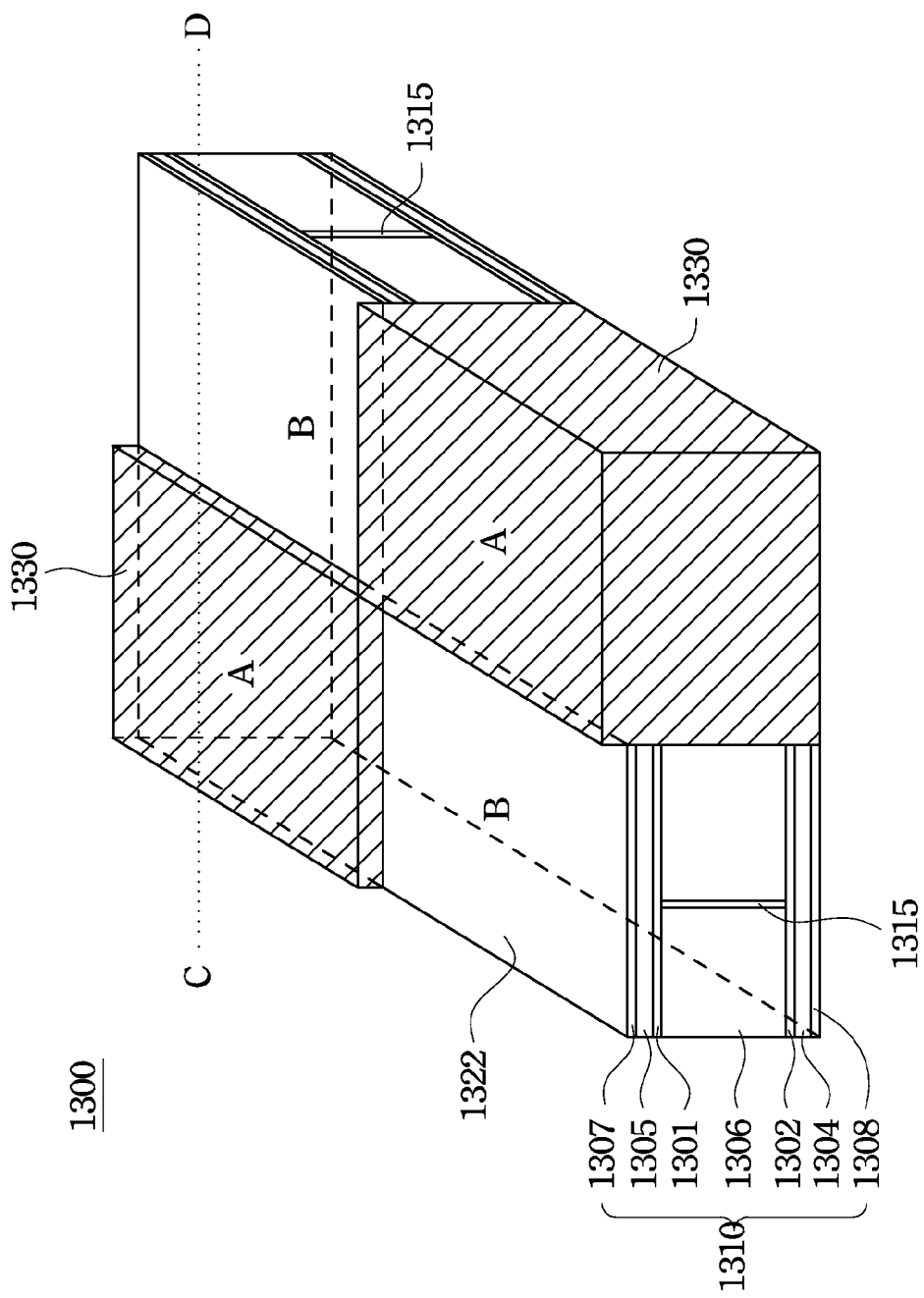
FIG. 13 shows a color regulating device for illumination according to an embodiment of the present invention.

FIG. 13 shows a color regulating device 1300 for illumination according to an exemplary embodiment of the present invention. As shown in FIG. 13, a liquid crystal layer 1306 composed of liquid crystal molecules and spacers 1315 is sandwiched between a first light-permeable substrate 1304 and a second light-permeable substrate 1305 to form a liquid crystal layer structure 1310. The liquid crystal layer 1306 has multiple liquid crystal cells (LC cell) 1322 for controlling grayscale respectively, which can cooperate with a pair of transparent electrodes 1301, 1302 on the light-permeable substrates 1304, 1305 to apply voltage to the liquid crystal cells 1322 for changing the twist and/or tilt of liquid crystal molecules in the liquid crystal cells 1322 between the transparent electrodes. Two polarizers 1307, 1308 are respectively attached to outsides of the light-permeable substrates 1304, 1305 relative to the liquid crystal layer. Arrangement of the polarizers and the alignment directions of liquid crystal molecules on two surfaces of the liquid crystal layer is set to normally white (NW), in other words, the liquid crystal cell 1322 without applied voltage is light-permeable. By changing the applied voltage to each liquid crystal cell 1322, grayscale of the liquid crystal cell 1322 is varied continuously to further control the luminous flux of outgoing light through each liquid crystal cell 1322.

In the embodiment according to the present invention, the first and second light-permeable substrates may be a rigid or a curved object or a flexible member. The first and second light-permeable substrates are selected from but not limited to the group consisting of: glass, quartz, polimethylmetharylate (PMMA), polystyrene (PS), methyl methacrylate-co-styrene (MS), polycarbonate (PC), polydimethylsiloxane (PDMS), and combination thereof.

FIGS. 14A and 14B are cross sectional schematic views along line CD explaining for a color regulating method using the color regulating device of the embodiment in FIG. 13. Referring to FIG. 14A, an blue light LED 1431 is used as a light source, and a liquid crystal cell 1422 (region B) is configured as the light-valving structure to control the luminous flux of a portion of the original light from the blue light LED 1431. Another part of the light form the light source enters a yellow phosphor layer 1430 (region A) which acts as the color-adjusting structure and is partially converted into an outgoing light with yellow wavelength band, and still another part of the light remains the light with blue wavelength band. The conversion rate of the outgoing light from the yellow phosphor layer with the yellow wavelength band to the blue incident light is controlled by the parameters such as the concentration of phosphor in the phosphor layer or thickness of the phosphor layer. At last, the outgoing lights from the regions A and B are mixed into a white light. In FIG. 14A, the region B illustrates a situation of the maximum luminous flux under no applied voltage, and in FIG. 14B the liquid crystal cell 1422 (region B) is configured as the light-valving structure to control the luminous flux of blue light, so as to accurately control the intensity ratio of the blue/yellow outgoing light and obtain the hybrid white light with a desired color temperature. Specifically, by means of biasing the liquid crystal cell 1422, the mixed ratio of the luminous flux of the blue light (region B) and the fixed luminous flux of the yellow/blue light transmitted from the phosphor layer 1430 (region A) can be accurately adjusted respectively, so as to achieve the purpose of finely and precisely regulating the color temperature of the mixed light. Further, the area of the yellow phosphor layer 1430 may be larger or smaller than the area of the liquid crystal cell 1422. The total area ratio of the yellow phosphor layer-coated region A and the uncoated region B depends on the demands in the actual applications or the desired color temperature to be obtained. In FIGS. 14A and 14B, although four LED light sources are shown, the number is for illustration only but is not limited. Strictly, the yellow phosphor layer 1430 should be considered as a green-yellow phosphor in definition, but is referred to as the yellow phosphor layer in short for convenient description hereafter. Moreover, in the present embodiment, the wavelength-band converting material is the aforementioned yellow phosphor material, i.e., the first wavelength-band converting material.

Figure 18:
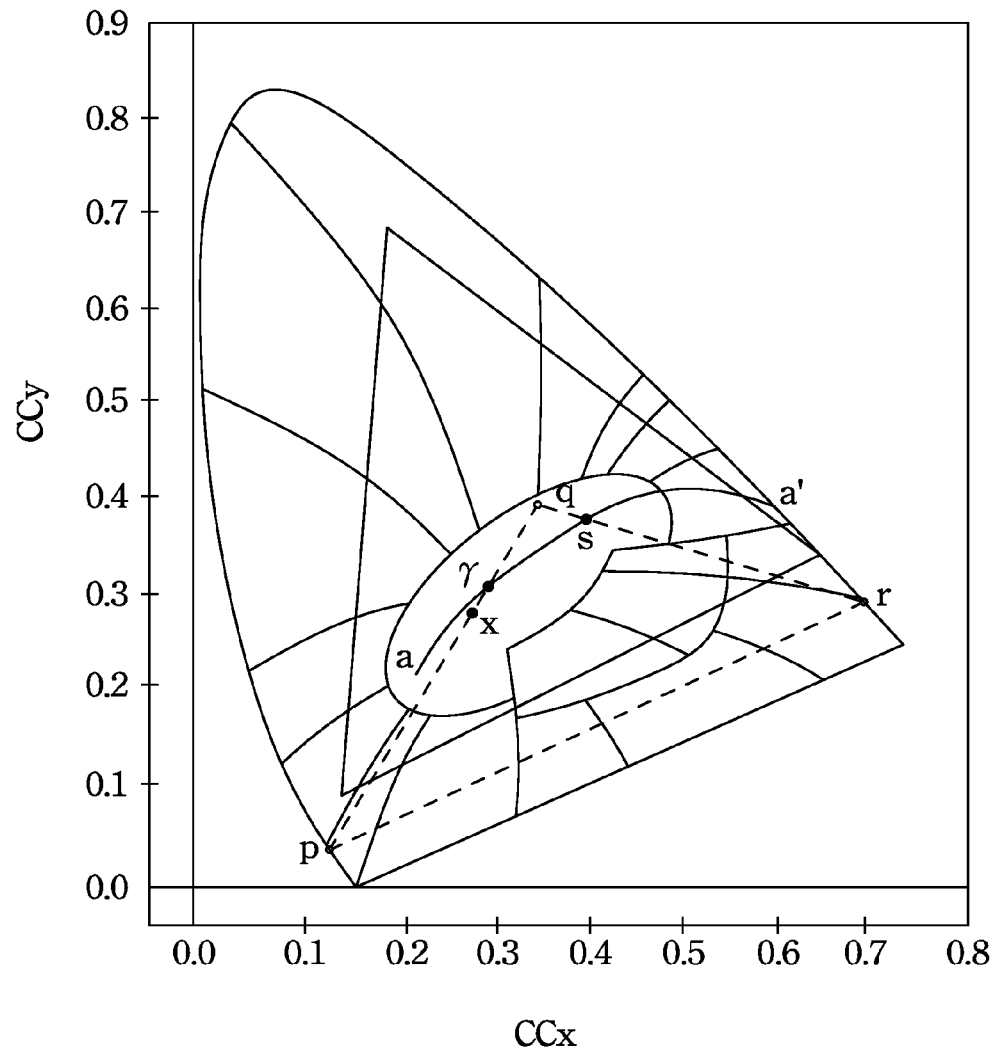
FIG. 18 is a CIE 1931 chromaticity diagram and chromaticity coordinates and adjustment of color temperatures of embodiments according to the present invention.

As shown in FIG. 18, line pq in FIG. 18 is composed of two end points of a blue LED light source with a wavelength of 450 nm cooperating with a yellow phosphor with the CIE 1931 chromaticity coordinate (CCx, CCy)=(0.4204, 0.5563). The chromaticity coordinate p refers to a blue light purely from the region B, and the chromaticity coordinate q refers to a mixed blue/yellow light purely from the region A. Any point on the line pq may be acquired by mixing the light sources of the two end points with a different mixing ratio. The color temperature of the intersection point of line pq and BBL is γ. In FIG. 18, it is assumed that the color temperature γ of an initial setting is under a condition (that the region B is not driven) while the yellow and blue lights from the region A are mixed with the blue light from the region B into a white light. When applied voltage in the region B increases, light transmittance of the blue light decreases gradually; in the meanwhile, mixed light moves from the color temperature γ of the original white light toward the chromaticity coordinate q to gradually become the close-to-yellow light. When the applied voltage increases to the close of the blue light region (region B), as shown in FIG. 14B, blue light of the region B is completely blocked; in the mean while, only the yellow/blue mixed light of the region A (chromaticity coordinate q) is left, i.e. the light that is transmitted out is yellow/blue light.

In an alternative embodiment, an orange-yellow phosphor is used to replace the yellow phosphor, such that the hybrid light after being mixed with the light from the blue LED light source is closer to the warmer color light. Further, as to the color light source (>5,300 K), the yellow phosphor and/or orange-yellow phosphor is used to adjust the outgoing light to a cold light (>3,300 K), a warm light or a even warmer color light. On the other hand, as an alternative embodiment, a purple light source is used and the phosphor is a green-yellow phosphor, or a green light source is used and the phosphor is a red phosphor, and a desired hybrid white light can thus be mixed.

Figure 14:
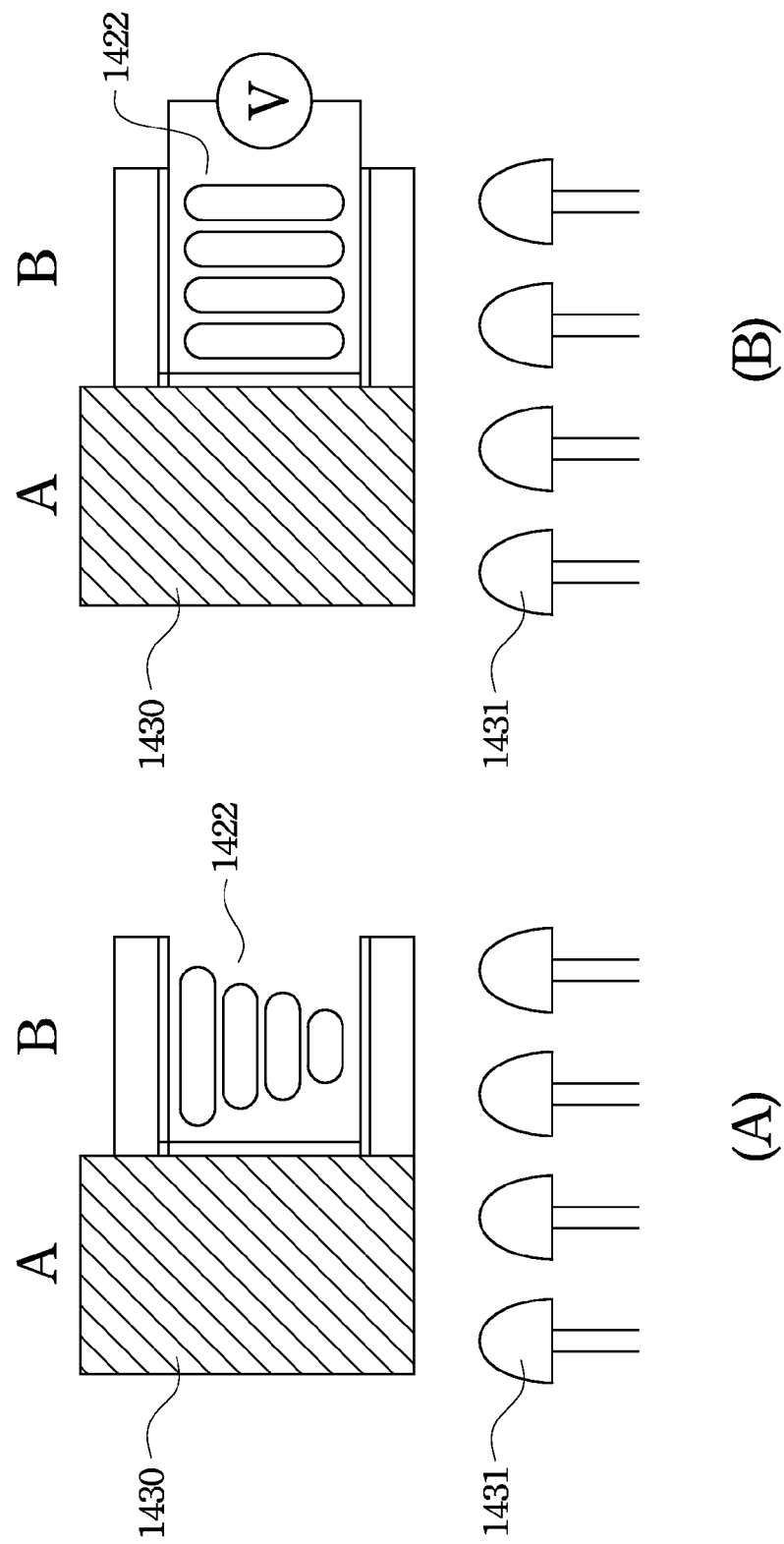
FIGS. 14A and 14B are cross sectional schematic views along line CD according to FIG. 13.

According to an alternative embodiment of the present invention, two polarizers are arranged to a normally black (NB) mode that liquid crystal cells are in the dark-state condition when voltage is not applied. The current embodiment, different from the embodiments illustrated by FIGS. 14A and 14B, has the two polarizers arranged to be parallel, as shown in FIG. 11B. Therefore, light rays cannot pass through the liquid crystal cells (in the NB mode) at all without applying voltage, but the process during being driven by the applied voltage can still be explained by FIG. 18. The difference only resides in the applied voltages are opposite to each other in NB and NW modes. In FIG. 14, the liquid crystal cell of the region B operated in NB mode is driven to reach a maximum intensity in the transmitted light. Assuming that the initial setting of color temperature x is under a condition that all of the regions are driven by voltages while yellow light and blue light are mixed into white light, where the color temperature x of the white light is not in the BBL curve as shown in FIG. 18. When all of the regions are first driven and then the voltage in the blue light region gradually decreases, blue light is blocked gradually and the mixed light gradually changes from the original white light (color temperature x) becomes a close-to-yellow light (color temperature q) which is mixed by the yellow and blue lights from the region A, as shown in FIG. 14. Thus, the corresponding chromaticity coordinate moves from point x to q in the CIE 1931 chromaticity diagram in FIG. 18, and the line xq intersects the BBL curve at the point γ which belongs to the cold white light in color temperature. Therefore, regulating the liquid crystal can finely and precisely the desired color temperature to the BBL curve. Alternatively, if a pure yellow phosphor is used to replace the phosphor material, the hybrid light gradually moves from the original white light to the warm light in the BBL curve (i.e., near the color temperature β in FIG. 1).

Figure 19:
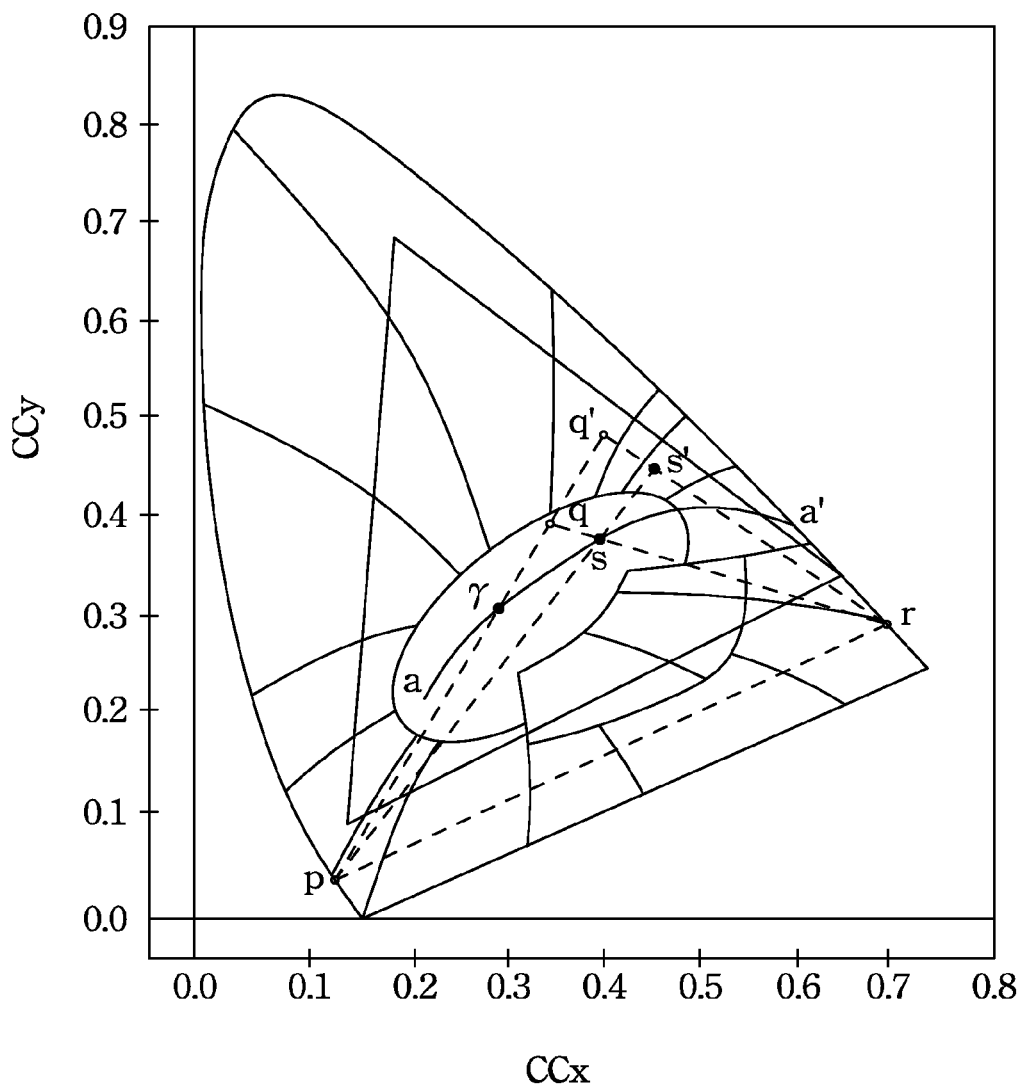
FIG. 19 is a CIE 1931 chromaticity diagram and chromaticity coordinates and adjustment of color temperatures of embodiments according to the present invention.

FIG. 15 shows the color regulating device according to another embodiment of the present invention. In FIGS. 15A and 15B, the device comprises a blue LED light source 1531, a light-valving structure of liquid crystal cells 1522 (region B), and a color-adjusting structure of yellow phosphor layer 1530 (region A). A part of light emitted from the light source 1531 enters the liquid crystal cell 1522 of the region B (i.e. the light-valving structure), which controls the luminous flux of the light transmitting therethrough; another part of the light emitted from the light source 1531 enters the yellow phosphor layer 1530 of the region A (i.e. the color-adjusting structure) and is subject to the conversion in wavelength band. Only a portion of the incident light of the region A is converted into the yellow light, and another portion remains the blue light as that of the blue LED light source 1531. The conversion rate of the outgoing light from the yellow phosphor layer with the yellow wavelength band relative to the blue incident light is controlled by the parameters such as the concentration of phosphor in the phosphor layer or thickness of the phosphor layer. In an embodiment, the region A of the yellow phosphor layer has an area larger than that of the region B, and the yellow phosphor layer 1530 is doped with a photoluminescence dye, which is selected to radiate wavelength in red light band under blue light excitation. Thus, such red photoluminescence dye 1532 doped in the yellow phosphor layer 1530 makes blue LED light have a additional spectrum of red light wavelength band after passing through the yellow phosphor layer 1530. The covering extent of the blue LED and the yellow phosphor layer 1530 on the chromaticity diagram may be expanded by the means of doping the yellow phosphor layer with a red dye, i.e. increasing the color rendering of mixed light. As shown in FIG. 19, after the blue LED light passes through the yellow phosphor layer doped (or mixed) with a certain amount of the red photoluminescence dye whose chromaticity coordinate is at point r, because a part of the blue light originally not reacted with the yellow phosphor of the region A is absorbed by the red photoluminescence (PL) dye, thus the chromaticity coordinate of the yellow/blue mixed light from the region A moves from point q to q' along line pq. Next, the chromaticity coordinate q' is connected with the chromaticity coordinate r, and a color temperature at a point of chromaticity coordinate s' is obtained in line q'r by mixing various proportions of light components. Then, controlling the intensity of the outgoing blue light from the region B (chromaticity coordinate p) through the light-valving structure of the liquid crystal cells, and mixing the outgoing blue light with the outgoing light with a chromaticity coordinate s' from the region A, a color temperature at point s, an intersection of s'p and the BBL curve, is precisely regulated. As an embodiment, the point s is a chromaticity coordinate of warm light, such that doping or mixing a predetermined amount of the red PL dye in the yellow phosphor layer is required to obtain the color temperature of warm light in the BBL curve.

According to an alternative embodiment, a red phosphor layer with a suitable concentration and thickness is coated over or beneath the yellow phosphor layer to replace the doping of the red PL dye. The transmitted light thereof is then mixed with the intensity-controllable blue light through the region B, to precisely regulate a color temperature of the hybrid light in the BBL of the natural light.

According to another alternative embodiment, a red phosphor layer with a suitable concentration and thickness is disposed at a side of, in front of, or behind the yellow phosphor layer to replace the doping of the red PL dye. The transmitted light thereof is then mixed with the intensity-controllable blue light through the region B. In the present embodiment, the yellow phosphor layer is a first wavelength-band converting material and the red phosphor layer is a second wavelength-band converting material. As such, the wavelength-band converting material of the color regulating device according to the embodiments of the present invention is the first wavelength-band converting material and the second wavelength-band converting material.

Figure 16:
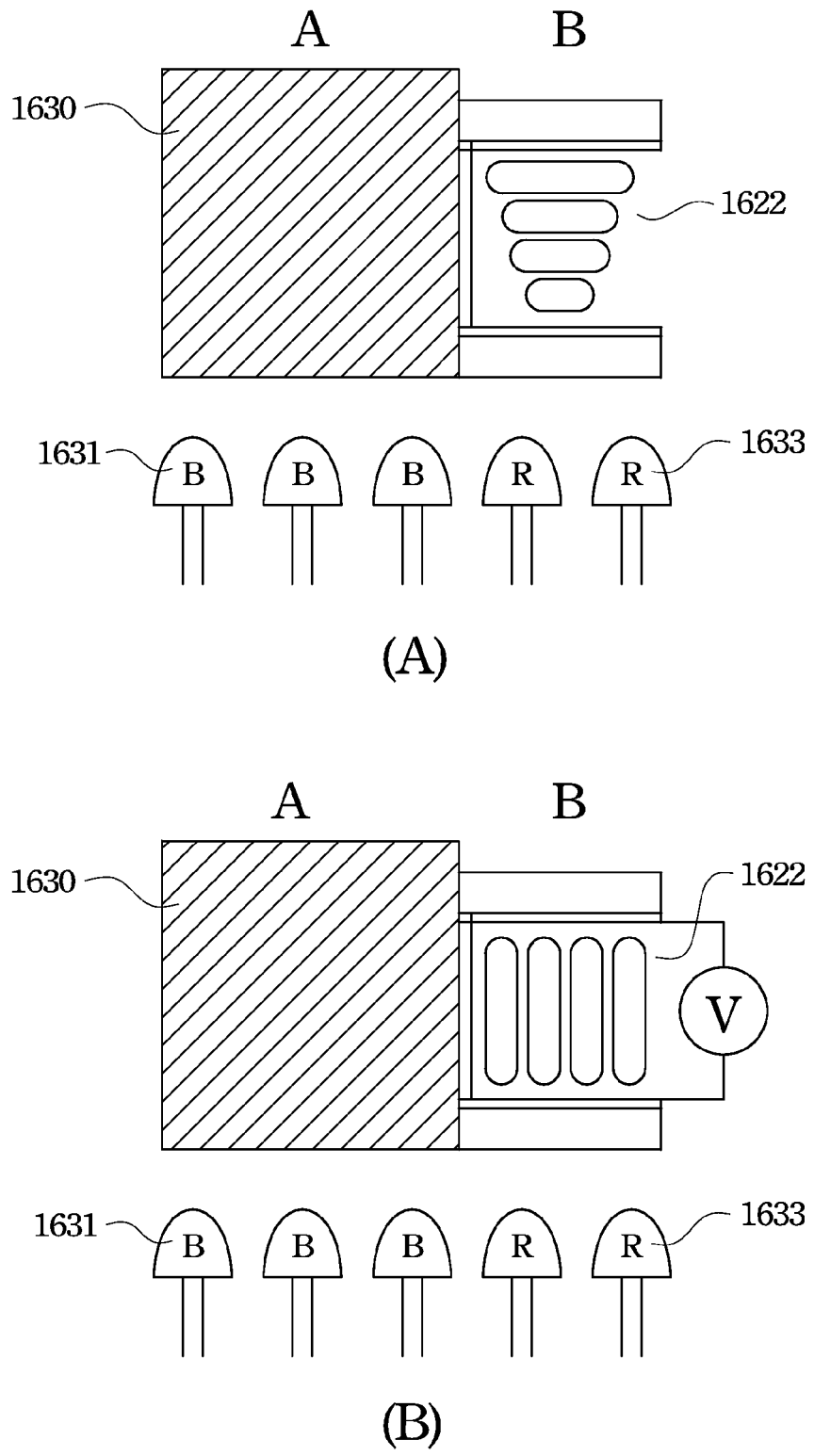
FIGS. 16A and 16B show a diagram of a color regulating device for illumination according to an embodiment of the present invention.

FIG. 16 shows the color regulating device according to another embodiment of the present invention. In FIGS. 16A and 16B, the device comprises a blue LED light source 1631 (denoted as B) and a red LED light source 1633 (denoted as R), a light-valving structure of liquid crystal cells 1622 (region B), and a color-adjusting structure of yellow phosphor layer 1630 (region A). Light emitted from the red LED light source 1633 enters the liquid crystal cells 1622 of the region B (i.e. the light-valving structure), which controls the luminous flux of the light transmitting therethrough. A part of light emitted from the blue LED light source 1631 enters the yellow phosphor layer 1630 of the region A (i.e. the color-adjusting structure) and is subject to the conversion in wavelength band. Only a portion of the incident light of the region A is converted into the yellow light, and another portion remains the blue light as that of the blue LED light source 1631. Reference is made to FIG. 18 for the operation mode for the device of FIG. 16. As shown in FIG. 18, the luminous flux of the red light (chromaticity coordinate r) is controlled by driving the applied voltage to the light-valving structure of the liquid crystal cells 1622 (region B), and the chromaticity coordinate q refers to the fixed luminous flux of the yellow/blue light in a ratio from the yellow phosphor layer 1630. The color temperature of the intersection of line rq and the BBL curve is a point s. With regard to a line rq, for two end points of different color lights, respectively controlling the relative intensity of the two color lights (i.e. the adjusting the red light transmittance of the region B) may accurately regulate and acquire a color temperature represented by any chromaticity coordinate on the line rq. Specifically, through controlling the intensity of the outgoing light from the light-valving structure of liquid crystal cells, the mixed ratio of the luminous flux of the red light (region B) and the fixed luminous flux of the yellow/blue light transmitted from the yellow phosphor layer (region A) can be accurately adjusted respectively, so as to achieve the purpose of continuously and precisely regulating the color temperature of the hybrid light.

In the present embodiment, the light source is made of various colors of LEDs. As embodiments of the present invention, the light source is a white light source in associate with another light source(s) with single color or various colors.

Figure 17:
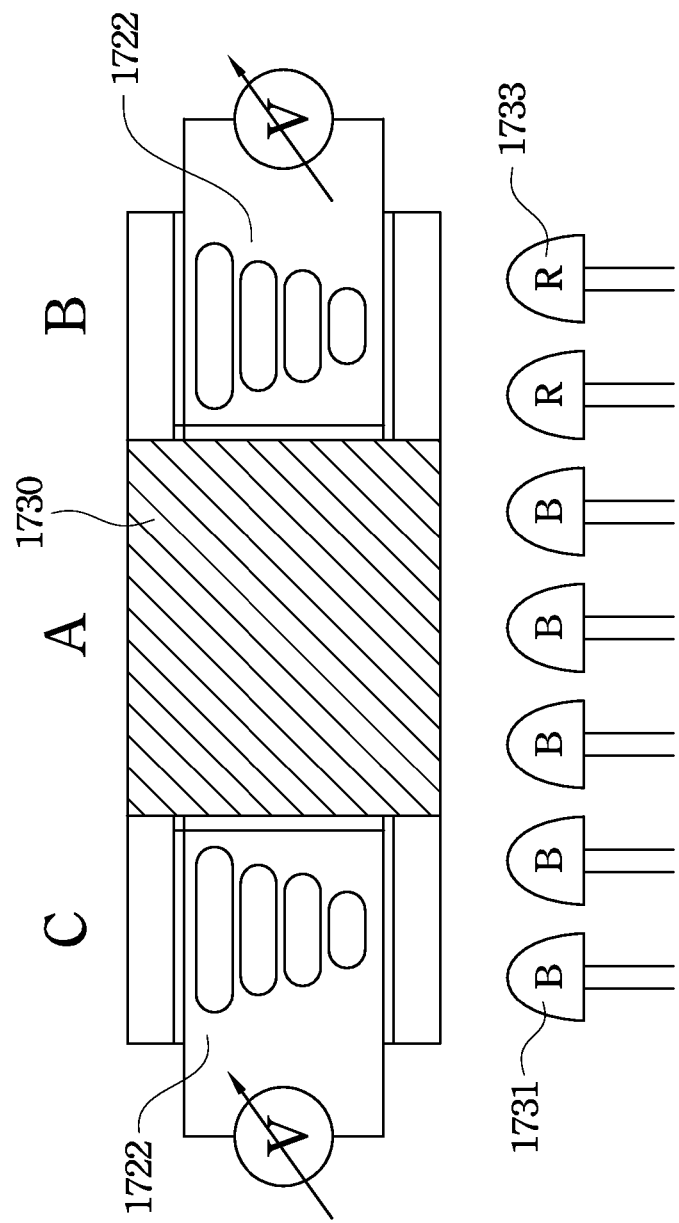
FIG. 17 shows a diagram of a color regulating device for illumination according to an embodiment of the present invention.

FIG. 17 shows the color regulating device according to another embodiment of the present invention. In FIG. 17, the device further comprises an independently driven liquid crystal cells 1722 (region C). The liquid crystal cells 1722 are able to control the luminous flux of the light from the blue LED light source 1731 (denoted as B) therethrough. In associate with liquid crystal cells 1722 (region B) capable of independently adjusting the luminous flux of the red LED light source 1733 (denoted as R), the chromaticity coordinate of the mixed light of the outgoing lights from the regions B and C can be adjusted to move all the way from point p to r in the CIE chromaticity diagram in FIG. 18. Concerning such blue/red mixed light and the fixed luminous flux of the yellow/blue mixed light (color temperature q) from the region A due to the blue LED light passing through the yellow phosphor layer, it is known from the CIE 1931 chromaticity diagram of FIG. 18 that the color temperature of the outgoing hybrid light can be regulated along line γs by independently regulating the intensity of red light transmitting through the liquid crystal cells of the region B and the intensity of blue light transmitting through the liquid crystal cells of the region C. In other words, the color temperature of the outgoing hybrid light can be regulated along the BBL curve. Further, in that the points p, q and r individually represent different outgoing light of different color temperatures, the hybrid light thereof has a chromaticity coordinate of any point in the triangular area enclosed by the p, q and r points, so as to increase the color rendering of the hybrid light.

The color regulating device and method capable of regulating wavelength band according to the present invention may simplify and optimize use of light sources. By accurately fine regulating wavelength band with different light sources (non-coherent visible light, ultraviolet, infrared, and coherent laser light source) or by using "continuously extensive adjustment of wavelength band" to replace illumination of multi-wave-band light sources, thus employing multiple light sources with different wavelengths is not necessary and the cost is greatly lowered. According to an embodiment of the present invention, the color regulating device for illumination is used to accurately and efficiently control the chromaticity coordinate of the outgoing light within the Planckian locus of the black body radiation spectrum. Further, the illumination apparatus according to the embodiments of the present invention, the illumination products can be made with a fixed color temperature or a variable color temperature product.

So-called light sources of the present invention generally mean light sources that are able to emit light with a specific wavelength band or multiple mixed wavelength bands (including incandescent lamps, CCFL and LED light sources). The light sources can use a chosen PL material according to variation of luminous flux ratio in the CIE 1931 chromaticity diagram to achieve a mixed light having a desired specific wavelength band or white light. The present invention explains by LED light sources for an example, because the problems of the color temperature of the LED white light sources itself deviating the natural light (color shift) and having insufficient color rendering are suitable for explaining the effects of the color regulating device and color regulating method for illumination according to the present invention. As mentioned above, if a white LED has color shift, the color temperature falls out of the grids region extent of FIG. 2, which means the white light LED is completely valueless for the indoor illumination application. However, by using the color regulating device and color regulating method for illumination in according to the present invention, the LED light source with color shift can be adjusted to the correct color temperature as shown in the BBL locus. Nevertheless, although the embodiments of the present invention use LED light sources for explanation, a person of ordinary skill in the art, after reading the disclosure of the present invention, will understand that the device of the present invention also has the same effects to other light sources.

In an embodiment according to the present invention, the light passing through the liquid crystal layer structure is mixed with the transmitted light through and excited by the phosphor to generate "light mixture" effect. Furthermore, the present invention can use liquid crystals to adjust the color of light sources from cold colored light to warm colored light all the way without apparently changing the intensity (luminous flux variation less than 15%). For the application of accurate adjustment of color temperature, variation of luminous flux can be much smaller to lower than 7%, so that it is difficult for a naked eye to be aware of the change. Furthermore, the present invention also overcomes conventional problems of light flickering during intensity adjustment of LED using electric current or complicated circuit designs for current LED chips.

Evenly Mixing of Outgoing Light-Diffusion Film and Light Guide Plate

An element made by the color regulating device for illumination of the exemplary embodiment according to the present invention has a size of 1.5 cm×1.5 cm. White light mixed by a distribution region of the phosphor that is formed in a specific pattern probably looks not evenly white due to unduly large light spots of blue light or yellow light. At this time, using a diffusion film to evenly diffuse colored light can blur a boundary between different colored light to make the whole colored light well mixed and uniform.

The diffusion film is mounted at a side of the device element of the exemplary embodiment opposite to the light source. To make a light bulb, a diffusion film may be coated on an inside layer of the light bulb. The diffusion film may also be replaced with a diffusion plate and diffusion lens. For example, using the light guide plate (LGP) makes projection modes of light rays more diversified. Large amount of $SiO_2$ particles inside the light guide plate (LGP) can make light rays to uniformly scatter and radiate into all directions, which makes the LGP have the similar function as that of diffusion film. Moreover, the diffusion film can be added on the LGP to further increase the uniformity of mixed light in intensity and color temperature. The region without the need for light transmission is covered by a reflecting mirror so that light to be transmitted on the region is reflected to another place. In actual applications, the diffusion film, diffusion plate or diffusion lens is located an outgoing light side of or surrounding the color regulating device for illumination.

Position of the Light Source of Incident Light Relative to the Color Regulating Device According to the embodiment of the present invention, incident light from the light source can also use reflective optical elements to guide the light of the light source to the light-valving structure (for example, a reflective liquid crystal layer structure, a color changing glass with a reflective mirror, an electronic paper, a reflective electronic book, a reflective electrowetting element, or a micro electro mechanical system device/piezoelectric device with a mirror reflector). In the embodiment according to the present invention, the positions of the color-adjusting structure, the light-valving structure, and the incident light source may be combined to generate functions or may act individually and then combined to achieve purposes of regulating color temperature of the light.

Three Dimensional Structure Formed by Multiple Light-Valving Structures/Color-Adjusting Structures In the embodiment according to the present invention, at least two light-valving structures (such as liquid crystal layer structures, color changing glasses) are used and set with a three dimensional framework, respectively control light-valving structures, further independently adjust luminous fluxes of outgoing lights entering corresponding color-adjusting structures. A cutoff point along BBL curve can be introduced between the two end points α, β in FIG. 1 to achieve a desired color temperature (for example, the color temperature closer to BBL curve).

In other words, one or multiple light-valving structures and one or more wavelength-band converting elements may be combined to form a three dimensional structure. The three dimensional structure may cooperate with optical elements (for example, mirror surfaces, lenses, etc.) to respectively or alternatively guide incident light into the light-valving structures in three dimensional structure according to design, then adjust required luminous flux of the outgoing light entering a corresponding wavelength-band converting element so that color temperature of the final outgoing light may be fine adjusted for achieving the purpose of being closer to BBL curve.

Light Path Adjusting Structure

The embodiment of the device, apparatus or method according to the present invention may use a prism or special structure to improve optical effects. To improve the brightness or polarization effects (converting light into a polarized light in the transmittance direction of an optical element), the color regulating device according to the present invention may selectively include any appropriate optical element such as lens, mirrors, light guide plate, brightness enhancement film (BEF), dual brightness enhancement film (DBEF), prism sheet, polarizer, lenticular film and combination thereof.

According to an embodiment of the present invention, the color regulating device for illumination is provided to finely and precisely regulate the chromaticity of the outgoing light to the BBL locus in the CIE chromaticity diagram. Further, the illumination apparatus according to the embodiments of the present invention, the illumination products can be made with a fixed color temperature or a variable color temperature product.

Furthermore, according to the embodiment of the present invention, using a single light source to accurately adjust the spectrum distribution or wavelength band of final outgoing light to achieve the light source effect that was only achieved by multiple light sources in the past.

In an embodiment, the liquid crystal layer structure is shown as FIG. 14 but the blue light source is replaced with a general white light source or an LED white source.

Figure 20:
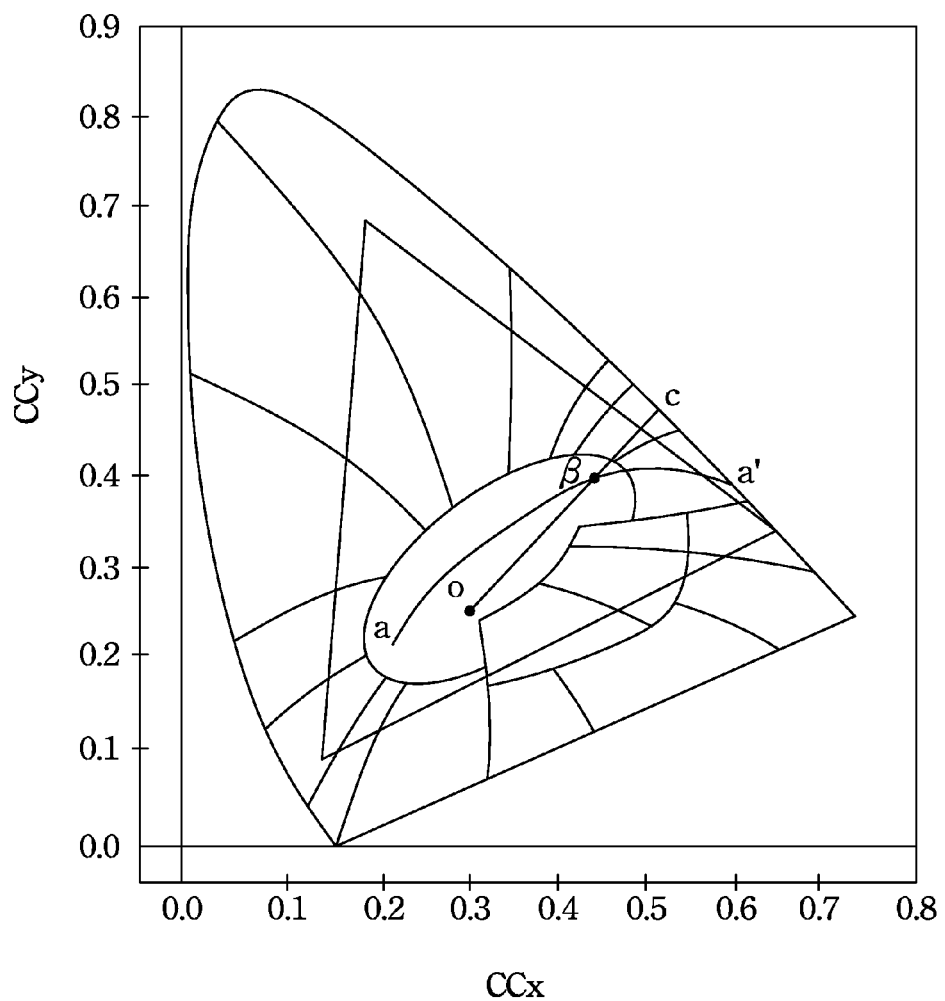
FIG. 20 is a CIE 1931 chromaticity diagram and chromaticity coordinates and adjustment of color temperatures of embodiments according to the present invention.

Referring to FIG. 20 of an embodiment of the present invention, a chromaticity coordinate of the used white light is a point o: (CCx, CCy)=(0.3, 0.25). The yellow phosphor is used with an outgoing yellow light at a chromaticity coordinate c in the CIE chromaticity diagram, so that the white light (chromaticity coordinate o) passing through the liquid crystal layer structure as a light-valving structure and the outgoing yellow light from the yellow phosphor with chromaticity coordinate c are linked to form a line oc in the CIE chromaticity diagram. The line oc passes through and intersects BBL at a point β, which is a chromaticity coordinate of warm light.

In an alternative embodiment, the yellow phosphor is replaced by an orange-yellow phosphor to obtain a mixed warm light with an even warmer color temperature than that of the original mixed light. Oppositely, if a mixed light with a colder color temperature is desired, the yellow phosphor then is replaced by an green-yellow phosphor, such that the mixed light of outgoing light from the green-yellow phosphor and the original white light will become a cold white light or cold light.

At present, an LED white light source inevitably has a spectrum that the blue green part is stronger, the yellow green part is weaker, and thus the yellow green part is sunken. Furthermore, when only yellow light is mixed with blue light, color temperature thereof tends to be cold and makes people feel uncomfortable. At this time, a red dye or red phosphor material may be added for color adjustment to make blue light become purplish light. The purplish light is then mixed with yellow light to obtain mixed light with warm color temperature.

Accordingly, the exemplary embodiments of the color regulating device of the present invention may be used to accurately adjust the unnatural white light deviating from BBL and identified by human eyes to BBL curve or to any other desired chromaticity coordinate.

In an alternative embodiment of the present invention, the blue light source is partially replaced with a white light source.

Figure 21:
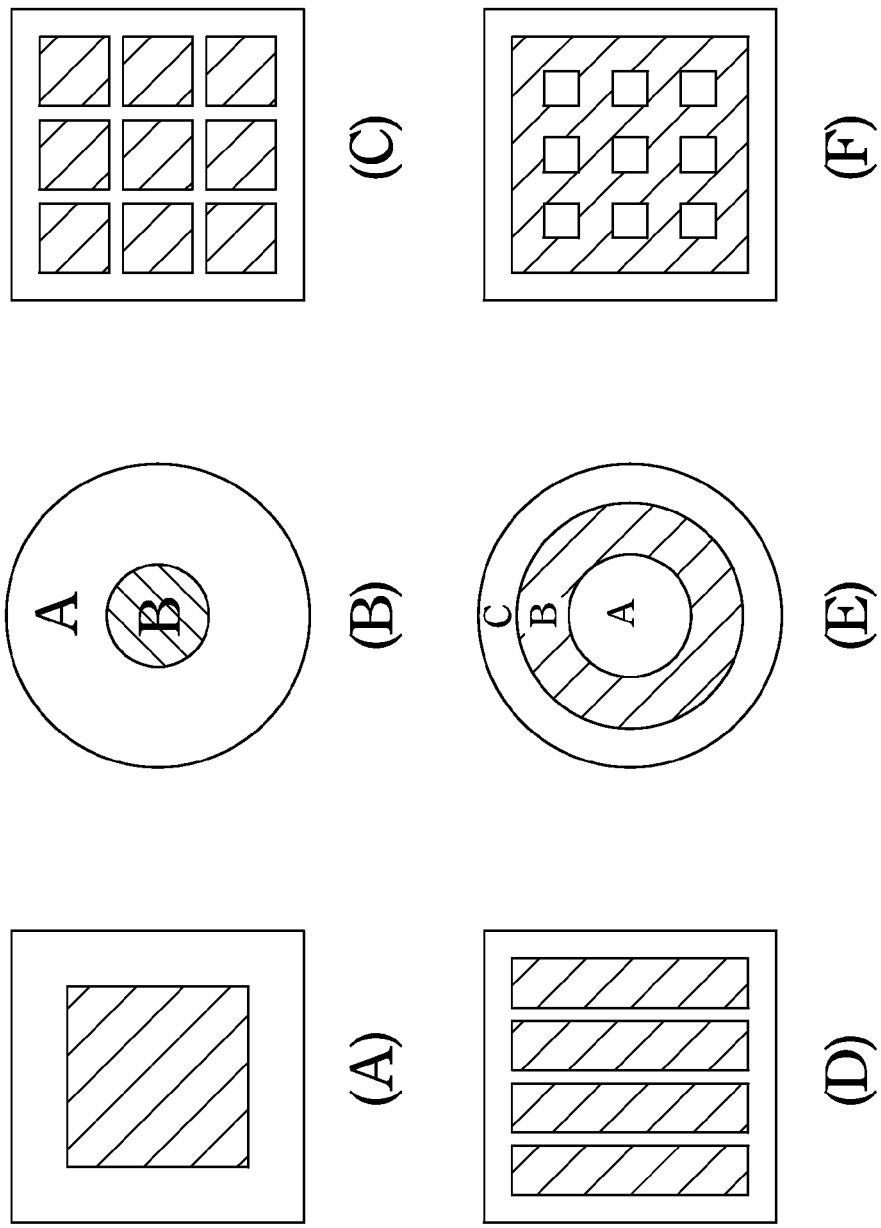
FIGS. 21A-F are schematic views of patterns of phosphor distribution.

In the embodiment according the present invention, distributions of the light-valving structure and the color-adjusting structure are shown in FIG. 21. In the figure, the blank region refers to the light-valving structure, and the slash region indicates the color-adjusting structure. By measuring the luminous flux per unit area of transmitted light of each of the yellow phosphor region of the color-adjusting structure and the blue light LED region, a ratio of region in which the yellow phosphor needs to occupy may be precisely calculated so that mixed light can acquire a predetermined chromaticity. Afterwards, the luminous flux of the transmitted light can be adjusted by applying voltage to drive the liquid crystal cell (the light-valving structure). For example, the luminous flux of the transmitted blue light or luminous flux of the transmitted yellow light may be adjusted for fine adjustment of chromaticity to achieve desired color temperature.

FIGS. 21A and 21B are schematic diagrams of the color regulating device according to the embodiments of the present invention, in which the size proportions and dimensions of the slash region is only for demonstration purpose. In practice, the optimized proportion and dimension are calculated based on the wavelength conversion rate of the phosphor layer and the intensity and the color temperature of the light source as the above-mentioned embodiments, so as to obtain the desired color temperature.

FIGS. 21C to 21F show the color regulating device for illumination according to an embodiment of the present invention. The phosphor layer configured as the color-adjusting structure can be finely divided into some smaller units in a uniform way to obtain even better effect of light mixture. According to an alternative embodiment as shown in FIG. 21E, the device for illumination is outwardly divided into three regions A, B, and C, in which the liquid crystal cells (regions A and C) are configured to control the transmittances of the backlight source in the region A and C respectively, and then the transmitted lights are mixed with light through the phosphor layer (region B) to form a hybrid light with a desired temperature. In this regard, the region C has a reduced area (about 15%). By way of driving the liquid crystal cell(s) of the region C through bias voltage, the region C in periphery of the element has a light transmittance lower than that of the region A in center, As such, it can reduce the luminous flux in the periphery of the LED light source which often has more severe issue of the space color shift.

According to an alternative embodiment, the color-adjusting phosphor layer is patterned as shown in FIG. 21B. In addressing the issue of the space color shift of the LED light source, there is a way to reduce the luminous flux of the outer annular area of the LED light source (region A), which usually has more severe space color shift. In design, the region A in FIG. 21B needs only smaller area (15%) to avoid too much loss in the total intensity of the LED light source. On the other hand, the region B with larger area (85%) can be configured into two (or more) colors of the phosphor layers in concentric circles, such that the transmitted lights from the respective phosphor layers (region B) and liquid crystal cell region (region A) can be uniformly mixed into a hybrid outgoing light with a desired temperature, along with proper optical elements.

As shown in FIGS. 21A to 21F, according to embodiments of the present invention, the liquid crystal cell of the blank region serves as the light-valving structure, which are replaced by the MEMS assembly, the color changing glass, the electronic paper, the electrowetting element or the combinations thereof. According to an alternative embodiment, in FIGS. 21A to 21F, the patterned phosphor layer of the color-adjusting structure is replaced by dye or a combination of phosphor and dye.

As shown in FIG. 21E, according to an embodiment of the present invention, the device for illumination is outwardly divided into three regions of A, B and C. In the present embodiment, the area of the respective regions A, B and C is changeable. The region A may be hollow or made of a transparent plate allowing a direct light transmission, and the transmitted light of the region A, the light transmitted through the phosphor layer (region B) and the light through the liquid crystal cell region (region C) are mixed into a hybrid light with a desired color temperature. The transparent plate may be a rigid or flexible thin plate, or a curved object (like a lens). The transparent plate is selected from but not limited to the group consisting of: glass, quartz, polimethylmetharylate (PMMA), polystyrene (PS), methyl methacrylate-co-styrene (MS), polycarbonate (PC), polydimethylsiloxane (PDMS), and combination thereof.

According to an alternative embodiment, different from the embodiment of FIG. 13, the color-adjusting phosphor layer is patterned as shown in FIG. 21B. The larger area of the region A (85%) locates at an outer annular area and the smaller area of the region B (15%) locates at an inner circle. Along with additional optical elements, the color lights are more easily to be uniformly mixed. In FIG. 21B, the region A is replaced with the phosphor layer and can be configured into two (or more) colors of the phosphor layers in concentric annular circles, and, on the other hand, the region B is changed to a region simply made of the liquid crystal cells. Further, as shown in FIG. 21E, a region can be sub-divided into three regions A, B, and C, but the regions A and C are changed to different colors of the phosphor layers and the region B to a simple region of the liquid crystal cells. The area of the respective regions A, B and C is changeable. Similarly, the outgoing light can be even uniformly mixed along with proper optical elements.

Figure 22:
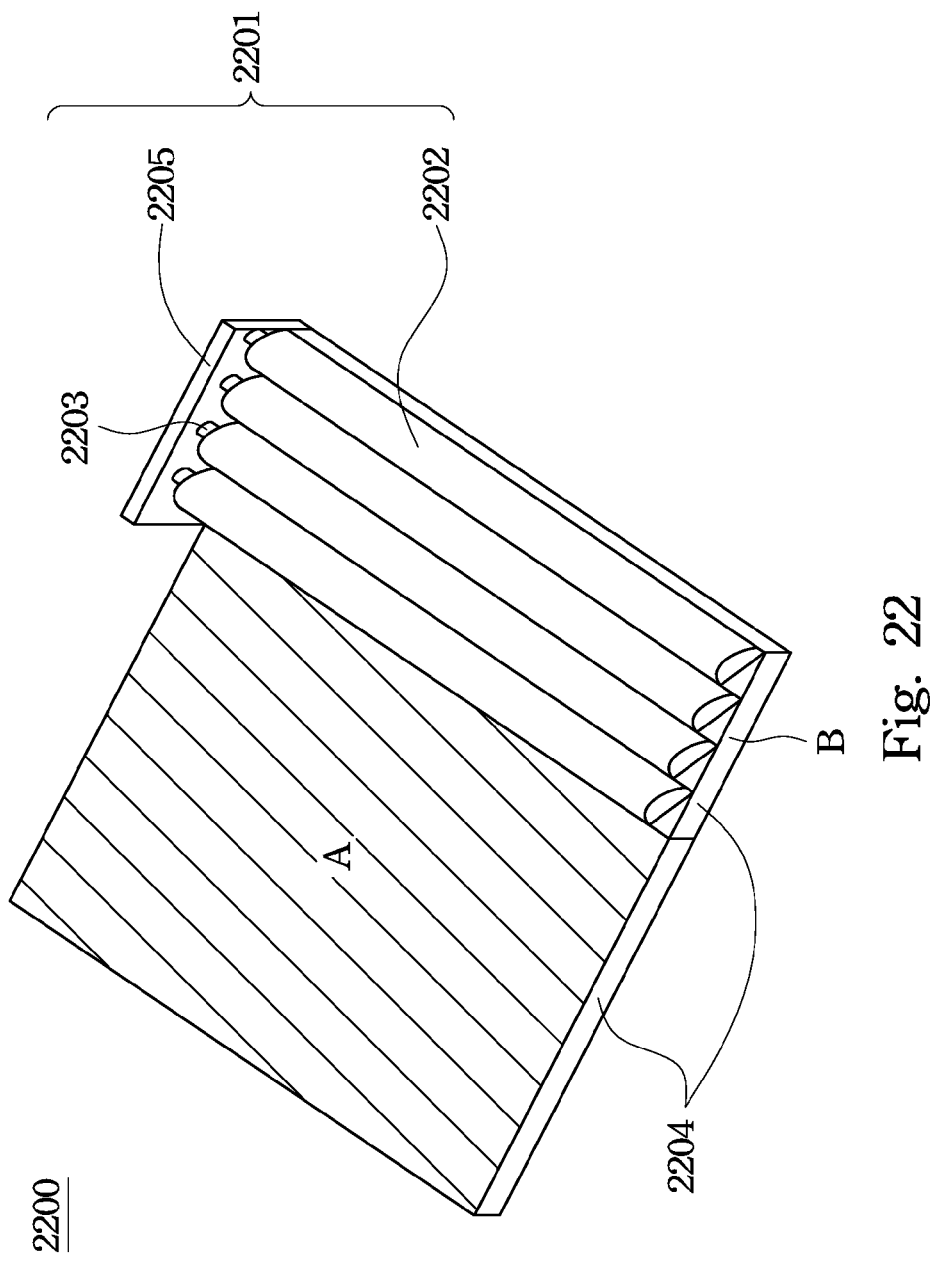
FIG. 22 shows an embodiment of the color regulating device for illumination in according to the present invention.

FIG. 22 shows a color regulating device for illumination 2200 according to an embodiment of the present invention, comprising a transparent plate 2204 serving as a base and having a surface, wherein the surface is divided into a region A and a region B, a yellow phosphor is coated on a surface of the region A but is not coated on a surface of the region B having a micro electro mechanical assembly 2201 serving as the light-valving structure which includes four shutters 2202 covered on the surface when no voltage is applied. The four shutters individually rotate and manipulate opening angles between the shutters and the beneath transparent plate 2204 by independently operating piezoelectric materials 2203 and a controlling element 2205 so as to adjust luminous flux through each shutter.

In an alternative embodiment according to the present invention, a length of the shutter 2202 (i.e. the light-valving structure) is half of that of the shutter in FIG. 22. In other words, the light-valving structure 2202 is separated into two independently operating assemblies that individually rotate and manipulate opening angles between the shutters and the beneath transparent plate 2204 so as to adjust luminous flux through the shutter. In another alternative embodiment according to the present invention, each shutter 2202 can be divided into ten square scales each having equal length and wide. Each square scale can independently operate an opening angle between the square scale and the beneath transparent plate. Further, the surface of each square scale is being applied with mirror coating, so as to make the micro electro mechanical assembly serving as the light-valving structure operated in the light reflection mode.

Opening manners of the shutter in the present invention are not limited to rotation and may adopt motions such as micro electro mechanical system (MEMS) element sliding, shifting, rising and lowering, etc. to change a distance between the shutter and the underneath transparent plate so as to adjust luminous flux through the shutter. Furthermore, other optical elements such as mirrors and lenses may be used to cooperate with piezoelectric elements having characteristic of changing dimension thereof with the applied voltage so as to adjust a flux ratio of incident light and outgoing light (may be in the forms of transmitted light and reflected light).

Illumination Apparatus

As shown in FIG. 23A, according to an exemplary embodiment of the present invention, a color regulating apparatus 2310 for illumination has a color regulating device 2311 which comprises a liquid crystal layer structure 2312 and a phosphor layer 2314. The color regulating apparatus 2310 also comprises LED light sources 2316 mounted in a casing 2318. The inner surfaces of the casing 2318 are coated with mirror surface coating 2319 to reflect leftward, rightward and downward light rays of the LED light sources to the color regulating device 2311.

FIG. 23B shows another alternative embodiment of the present invention. A color regulating apparatus 2320 for illumination has a LED light source 2326, a color regulating device 2321 and a casing 2328. The color regulating device 2326 includes a liquid crystal layer structure 2322 and a phosphor layer 2324. The LED light sources 2326 in the color regulating apparatus 2320 do not abut the liquid crystal layer structure 2322 in the color regulating device 2321 but is at a distance d from the color regulating device. Because the distance from the LED light sources 2326 of the current alternative embodiment is larger than that in the color regulating apparatus 2310 in the above embodiment shown in FIG. 23A, under the same light source condition, an environmental temperature $T_B$ in which the liquid crystal layer structure 2322 is placed is lower than the color temperature $T_A$ in which the liquid crystal layer structure 2312 is placed. Furthermore, the casing 2328 of the current embodiment is not coated with a mirror surface coating.

Additionally, with the concept of a light guide plate (LGP), it is possible to design any LGP shapes. For example, a column shape LGP allows light rays entering the light guide "column" to diffuse and scatter in the column and make the whole light guide column evenly "shine".

In a color regulating apparatus for illumination according to an exemplary embodiment of the present invention, FIG. 24A shows a semispherical light bulb 2410, which has a base 2418, a casing 2417 and a diffusion film layer 2411 coated evenly on an inner layer of the light bulb 2410. As shown in the figure, $SiO_2$ particles 2413 with different sizes are spread inside a rod-shaped LGP 2412, which can expand and spread the mixed light to the whole semispherical light bulb by the color regulating apparatus 2410 for illumination of the exemplary embodiment according to the present invention. The LED light sources 2415 in the current embodiment not only separate from the liquid crystal layer structure 2416 but also have transparent adiabatic material 2414 disposed between the LED light sources 2415 and the liquid crystal layer structure 2416 to further lower the environment temperature in which liquid crystal layer structure of the apparatus is placed.

FIG. 24B shows a color regulating apparatus for illumination according to an exemplary embodiment of the present invention, a column-shaped light tube 2420 includes a color regulating apparatus 2430 for illumination similar to that in the embodiment shown in FIG. 23A. The color regulating apparatus 2430 comprises LED light sources 2425, a casing 2427 and color regulating devices for illumination-color changing glasses 2426. The LGP 2422 is column-shaped and allows mixed outgoing light to evenly emit from the whole column. Therefore, the column-shaped LGP 2422 may be designed to serve as a "light tube." With the diversified LGP designs, the color regulating apparatus for illumination may be applied more widely in various aspects.

In the aspect of adjusting light intensity, conventional incandescent tungsten lamps or cup light commonly used in hotels may use a simple light adjuster (fixed voltage and adjust the electric current by changing resistance) to accurately continuously adjust the intensity of the light source. The LED itself is a diode that the characteristic curve of current versus voltage is an exponential function so that conventional adjusters cannot be used for controlling and changing light intensity at will. Most of currently marketable LED light bulbs adjust light intensity by stages, for example, 8-stage variable intensity. Such manner needs an additional complex controlling module to replace the simple light adjuster so as to greatly increase the cost. An LED light bulb with continuous adjustment functions, when set in low light intensity, has unstable flickers, which decreases the lifespan of such LED light bulb and hurt human sense.

A light bulb switch may be integrated with a variable resistor knob (by using a latch-type knob), such that the voltage across a liquid crystal element, i.e. the light-valving structure, can be changed via adjusting the resistance of the variable resistor, so as to manipulate the luminous flux of the light through the liquid crystal element. As a result, the color temperature of the hybrid light through the device according to the embodiments of the present invention can be continuously changed, or only be changed in intensity of the outgoing light. In an alternative embodiment according to the present invention, a base of the light bulb 2410 is mounted with a "circular knob" to adjust the resistance of the variable resistor, so as to continuously change the color temperature of the hybrid light, or only change the intensity of the outgoing light.

According to an embodiment of the present invention, a switch or other functions in the bulb can be configured as a controlling circuit, which controls the voltage to manipulate the luminous flux of the light through the light-valving structure or the color-adjusting structure, so as to continuously change the color temperature of the hybrid light or only to change the intensity of the outgoing light.

In another alternative embodiment according to the present invention, the color regulating device achieves wavelength conversion of incident light by an interfering means (by adjusting the space between the two aforementioned thin sheet-like materials) instead of using a wavelength-band converting material.

In another alternative embodiment according to the present invention, LED light sources and the color regulating device according to the present invention are mounted two ends of light guide plate (i.e. column or tube) with an appearance similar to a current fluorescent lamp tube and to replace the fluorescent lamp tube which uses electricity to excite mercury vapor for stimulating the phosphor. The light guide plate (LGP) often has submicron particles dispersed in it to make the light rays scatter evenly. Moreover, the diffusion film can be further attached on the LGP to make the light scattering more uniformly in it. With regard to the embodiment of long light tubes, besides two ends of a light guide tube, multiple LED light sources and corresponding color regulating devices can be mounted in intermediate parts of the light guide tube.

It is worth to mention that backlight sources (for example, LEDs, CCFLs) cooperates with liquid crystal layers for adjusting grayscale to control light fluxes of the three primary colors of a pixel entering a filter so that the desired color for the pixel is obtained. Such structure has been commonly used in liquid crystal displays (LCDs). However, so-called "display" means that the display relies on pixels of N×M to make human eyes to obtain recognizable information and presents specific pictures (i.e. motion pictures) during persistence of vision. In other words, recognizable or realizable information (or pictures) must be given people. Therefore, displays all need complicated driving circuits. A driving circuit needs to completely scan all pixels of the display based on required signals of three primary colors within a period of 16 ms. Both N and M values are at least large from 100 to 200 to enable a function of the display; otherwise a problem with insufficient resolution (insufficient information expression) happens.

On the contrary, it is different to use patterned color-adjusting structure to cooperate with liquid crystal cells for illumination. It needs neither hundreds of pixels nor complicated driving circuits and has no problems requiring fast response time of liquid crystals. Furthermore, the greatest difference between liquid crystal cells and LCDs is that the liquid crystal cells are not required to send human-recognizable pictures or information. Moreover, LCs used in displays, due to the requirement of high-quality motion pictures, need to have properties such as fast response time, high contrast ratio, wide view angle, etc. Therefore, stability of LC materials for displays is highly required. On the other hand, the LC alignment layer may be made by an inorganic deposition method, which results in an inorganic alignment layer with the advantages of better heat resistance than the traditional alignment layer, so as to be more suitable in the application of indoor illumination. Also, using high-energy ion beam bombardment on a target surface is an alternative way of producing LC alignment.

In summary, because purposes of the liquid crystal layers for LC cells and LCDs are totally different, numbers of the liquid crystal cells driven by voltage to adjust grayscale are greatly different. Specific conditions must be required for a display so that it is impossible to use few liquid crystal cells serving as light valves for a display. Different from the LCs used for displays, the LC layer structure of the color regulating device according to the present invention is required to consider light transmission efficiency and bearable temperature of heat generated by light sources. Also, liquid crystal cells with normally white mode and normally black mode may be used to continuously adjust the outgoing light of any light sources (such as LEDs) from brightness to dark or from dark to brightness without flickering happens. What is more important is that a conventional LCD filter completely converts light of a backlight source to three primary colors of red, blue and green or four colors and totally absorbs light of other wavelength bands in sub-pixels. Therefore, after the light from the backlight source passing through the LCD filter of the three primary colors, each of the sub-pixels normally has luminous flux loss over 70%. If taking the polarizer into consideration which absorbs at least more than 50% of the backlight source, the intensity of outgoing light relative to that of the backlight source is less than 15%. Moreover, with the absorption of other additional optical films, the light transmission becomes much lower than 15%. On the contrary, the color regulating device and method according to the present invention convert part of light of the original light source through the wavelength-band converting material (e.g. phosphor) and then the converted light is mixed with other part of the light (e.g., the light passes through the LC cell) of the original light source. As illustrated above, if the polarizers occupy less than 25% of the total area of all LC elements, the luminous flux loss is lower than 15%. Therefore, if using the non-absorption polarizer to replace the aforementioned traditional polarizer, the loss of luminous flux can be further reduced to be lower than about 7%. Further, in the application of the present invention to accurately regulate the color temperature of a light source, since the area of the LC elements to be driven can be even smaller, the luminous flux loss can be reduced to a level below 7%. If using the color changing glass as the light valve without need of the polarizer, the luminous flux loss can be even reduced down to about 3-5%, which means a light transmittance higher than 95%. Given the above, in that any light sources can be adjusted to achieve color temperature of "sunlight" by more economical manners, human lifestyle is greatly changed.

Because light wave itself has electromagnetic characteristics and may transfer freely between other types of energy (for example, heat, potential energy), once accurately controlling the wavelength band is achieved by the embodiments of the present invention, it can be applied extensively to various fields of human life. For example, the accurate color regulating device and apparatus according to the present invention may be applied to various fields. Besides the purposes of indoors and outdoors illumination (table lamp, desk lights, etc.) the device and apparatus may be also used extensively in fields of outdoors building light projection and advertisement illumination, traffic light devices, car lamps, medical treatment purposes (beauty laser, anti-bacteria/anti-virus/anti-fungus purposes against bacteria/virus/fungus propagation and cultivation, anticancer purpose, radiation and decomposition of specific allergens, etc.), human factor application (mood and art lighting, reinvigoration, sleep assistance, vision assistance, etc.), energy (batteries, etc.), signal transmission (optical fibers, continuous modulation coupling elements, frequency dividers for dividing light waves with different frequencies, etc.), safety facilities and installations (escape apparatuses, etc.), inspection and analysis (non-destructive material inspection, spectrometers, etc.), optical elements (microdisplay light sources, optical pickup heads, etc.), agricultural applications and ecological cultivation (planting, fruit nurture/greenhouse breeding and fishery cultivation and catching of fishes/shrimps/crabs/shellfishes, etc.), military purposes (night vision/head up display, etc.), aviation (alarm and illumination, etc.), and wilderness survival.

The color regulating device, apparatus and method according to the embodiment of the present invention, in the medical field, may provide laser light sources with different wavelength bands for removing/weakening dark spots (elder spots, age spots, pigment spots, liver spots, dark regions and angiomas), laser removing moles and hairs, grinding cuticle, tightening skin by electric wave, and reducing pores of the skin. The popular laser cocktail therapy recently combines laser devices emitting laser beams with different wavelengths and power (for example, depi-light laser, intense pulsed lasers with different colors, white intense pulsed light, ruby laser and pulsed dye laser, etc.) to achieve effects of removing/weakening spots, laser removing moles and hairs, grinding cuticle, tightening skin by electric wave, and reducing pores of the skin. Finally, skin with white color and tightness as well as a ceramic doll can be acquired.

Furthermore, an embodiment according to the present invention may be used in photodynamic therapy purposes. The photodynamic therapy was originally developed for restraining proliferation of malignant melanoma. After greatly lowering its power, the photodynamic therapy is widely used in beauty medical fields. So-called photodynamic light includes two different light sources having red light with wavelengths of 633 nm and blue light with wavelength of 413 nm. In the visible spectrum, the red light with the longest wavelength penetrates deepest so that photodynamic red light is capable of entering the dermal layer, expanding, strengthening blood capillary to improve blood circulation, stimulating fibroblast cells, strengthening collagen fiber structures to achieve purposes of weakening fine wrinkles. The photodynamic red light may also be used in therapies of super dry or atopic skin. For example, after skin is smeared with skin care products having high moisturizing performance and vitamin C, red light is applied on the skin to activate cells of outer skin and achieve curing and moisturizing purposes. Photodynamic blue light is mainly used to cure acnes that are commonly referred to pimples. Acnes result from that the proliferation of propionibacterium acne which is capable of decomposing sebum and causes folliculitis of the sebaceous glands. Such acnes generate phosphor is called "porphyrin." However, irradiation of blue light of specific wavelength changes the characteristic of such porphyrin to kill propionibacterium acne and achieve purposes for curing acnes.

According to researches, irradiation of light wave with a specific wavelength or color temperature helps to accelerate the differentiation/duplication/proliferation of stem cells, assist cells and tissues culture, and improve biomedical and physiological related researches. The embodiment according to the present invention focuses the adjusted and mixed light to irradiate parts of cells such irradiation on scalp to activate/regenerate cells for activating hair follicular cells or improving blood circulation around hair follicles to achieve purposes of hair restoration/hair thickening and lowering seborrheic dermatitis.

The embodiment according to the present invention may be used in surgeries and therapies of eye related diseases. For example, continuously leading light with different wavelength bands into an eye lens to scatter collective floaters of myodesopsia or leading the light into the lens to scatter turbid matter incurring cataract or make the turbid matter absorb the light with the specific wavelength and then decompose. Glaucoma arises because increased intraocular pressure caused by worse liquidity of aqueous humor of the anterior chamber of eyes presses optic nerves. Therefore, irradiation light with a specific wavelength band is used to make aqueous humor of the anterior chamber of eyes to flow normally and then reduce the intraocular pressure.

The embodiment according to the present invention may be used in optical instruments such as laser light sources of (optical) telescopes and (optical) microscopes to stimulate fluorescent protein, assistant light sources for photography/inspection/therapy/surgery of endoscope or laparoscopes with changeable wavelength band, skin cancer inspection such as irradiation on "sections" of specimen taken from cancer staging surgery with a specific light source and analysis of color of the tissue sections, and urine (protein) spectrum inspection. In the embodiment according to the present invention, the light source with accurately controlled wavelength band or color temperature may be used in criminal identification. Under irradiation with a multi-wave-band light source, different human tissues (for example, bloodstains) and artificial products (for example, fibers) show specific colors.

In the embodiment according to the present invention, the light capable of continuously regulating color temperature or wavelength band may be used in cell culture/physiological experiment and researches of organs and tissues (for example, optical fibers are led into a brain to for irradiation/collection/analysis of reaction). Furthermore, it may be applied to experimental and research fields of chemistry/physics/(Raman or FTIR spectrometers)/material (interferometers for measuring material thickness, 3D topology surface analyzers)/chemical engineering/electro-optical/biological (HPLC)/test tube for light scattering (experimental understanding the process of dynamic behavior from molecular reaction).

A laser beam with a specific wavelength band can stimulate fluorescent protein, amino acid, and tissues that are dyed by fluorescent dyes. Dyes are used to mark out tumor regions at the present. For example, blue and green lights are used to irradiate organ cells dyed by fluorescent dyes. An embodiment according to the present invention, converts a wavelength of a single laser light source to employ the light with a changeable wavelength band to irradiate a region to be inspected inside human tissues. With respect to normal and abnormal cells, after it is dyed by multiple fluorescent dyes with different wavelength reactions, a laser light source according to the present invention that is fine adjustable and capable of accurately selecting wavelength band is used so that the boundary between normal cells and cancer cells may be delimited explicitly even the cancer cells are a few. Thus, the cancer or abnormal cells may be excised in a staging surgery as far as possible. For example, if a specific cancer cell corresponds only to a specific fluorescent dye (for example, yellow green light with a specific wavelength band is the most reactive), adjusting the laser light source to specific intensity ratio of yellow and green light in a surgery will find out the position and deal with the abnormal cell tissues of the specific cancer cells.

The embodiment according to the present invention may be used in light sources for photo curing dental curable materials.

There are researches indicating that specific wavelengths or wavelength bands accelerate or affect the growth of animals/plants. The embodiment according to the present invention may adjust and change the color temperature or wavelength band of light used to irradiate plants/animals in a specific environment (for example, a green house or fishpond) based on time to create illumination conditions most advantaging the growth of plants/animals. The embodiment according to the present invention irradiates with light of the specific wavelength band during operation of fishery cultivation or catching of fishes to accelerate the growth of fishes or concentrate the fishes to facilitate catching.

In the embodiment according to the present invention, the wavelength-band adjusting element or method and steps, a specific wavelength-band absorbing material or element may be added into a color adjusting structure to reduce a luminous flux thereof to adjust color temperature or wavelength band of the mixed light. For example, a specific wavelength absorbing material that decomposes and decays as time goes by may be added into objects or food packaging materials and cooperates with a design of mixed light to change the color of the mixed light through the light color adjusting structure as time goes by so that the objects or food packaging materials may serve as an indicator or be designed as a self-timer including an LED light source to indicate that such object or food has expired.

The embodiment according to the present invention may be used in military purposes, for example, infrared night vision goggles and near-eye goggles may achieve purposes of enhancement of visual image by filtering certain wavelength bands of light for information processing. Furthermore, the embodiment according to the present invention may be used in security check of airports (public places); for example, infrared light wavelength band is used to irradiate entering passengers to measure body temperatures for public health. Concerning other examples, both large-scale space telescopes and small-scale amateur telescopes can use stars as light sources to continuously switch a spectrum by the color regulating device of the embodiment of the present invention so that the intensity of a spectrum region to be observed is changed or a wavelength band of the spectrum is converted, for example, the infrared spectrum is converted into other spectrums.

The embodiment according to the present invention uses carbon nanotubes as light-valving structures or directional quantum dots based on physical, chemical and dynamic characteristics of the carbon nanotubes. For other nanotubes of different materials may also be used as light valve. A light source may also use nanotube LEDs (e.g. carbon nanotubes radiates when electrified). Furthermore, the embodiment can cooperate with carbon nanotubes to connect to specific ingredients for heat dissipation purposes.

The embodiment according to the present invention may use the color regulating device and method for illumination to generate artificial sunlight; in other words, sunlight simulation devices are accordingly manufactured for sunlight energy experiments, sunlight lamps or sun beds (or sunbathing machines). In the application of sunlight lamps, regulating the wavelength band of light that the skin pigmentation is sensitive achieves purposes of sun tanning skin and also removes the wavelength band that is hazardous to the skin and lowers danger of causing skin cancer. The embodiment according to the present invention may manufacture low-priced experimental solar simulators. A principle of the present solar simulators is to use high-energy plasma excitation with a plurality of correctors to acquire full spectrum light (the full spectrum includes a time-varying visible spectrum and low intensive UV and IR frequency spectrums). Generally speaking, sunlight is close to yellow green. The embodiment according to the present invention may use a combination of halogen lamps and incandescent lamps or use LED white light sources, IR light sources and UV light sources and cooperate with a light color adjusting structure including yellow green phosphor layer and reducing intensity of blue light to acquire realistic sunlight.

In the embodiment according to the present invention, a light source through wavelength adjustment may also be used in light and sound entertaining objects such as toys or amusement devices. Moreover, in jewelry identification, the device capable of continuously accurately regulating color temperature (wavelength band of light) according to the present invention is able to provide desired necessary specific light sources.

The embodiment according to the present invention employs the device capable regulating color temperature (wavelength band of light) to chemical/photosynthesis reaction mechanism. For example, in the manufacturing and product synthesizing processes of chemical engineering/industrial/plastic materials, cracking and synthesizing processes of petroleum raw materials, and synthesizing processes of medicine, irradiating light of specific wavelength bands during reactions can accelerate/improve chemical reactions. Furthermore, another embodiment according to the present invention may be used in chemical/industrial fields, for example, in the aspect of bread manufacturing/wine making processes, yeast is irradiated by a specific wavelength band to accelerate or affect and control activity of the yeast and the progress of yeast reaction.

According to embodiment of the present invention, in exposure machines of semiconductor photolithography processes using photoresist (for example, deep UV light sources are used for immersion exposure), using the illumination (light irradiation) apparatus of the present invention may continuously adjust the wavelength band of light to save light energy and lower the cost. Furthermore, multiplicity of variable wavelength band of the light source advances researches in variety of potential photoresists and the development of exposure/developing technologies.

Although the present invention combines several exemplary embodiments for explanation and description, a person of ordinary skill in the art may understand that changes or modifications can be made without departing from the scope and spirit defined in the attached claims of the present invention. For example, the light valve for continuously adjusting luminous flux of outgoing light may be changed and replaced by current similar technologies. Alternatively, the CIE 1931 chromaticity diagram may be replaced by other CIE chromaticity diagram for reference of BBL coordinate depending on the demands

What is claimed is:

1. A color regulating device for illumination, configured to regulate a color temperature of light interacting with the device, comprising:
    a light-valving structure for adjusting a flux ratio of a first incident light of a first light source to a first outgoing light of the light interacted with the light-valving structure;
    a color-adjusting structure having at least one wavelength-band converting element, configured to convert a second incident light with a first wavelength band into a second outgoing light with a second wavelength band; and
    wherein the light-valving structure and the color-adjusting structure do not overlap with each other on a traveling path of the light, such that the first outgoing light and the second outgoing light are mixed to form a hybrid light with a color temperature different from that of the light, and another light emitted from a second light source is mixed with the hybrid light.

2. The color regulating device for illumination as claimed in claim 1, wherein the second wavelength band covers the first wavelength band.

3. The color regulating device for illumination as claimed in claim 1, wherein the hybrid light is further mixed with a portion of the light not interacted with the device.

4. The color regulating device for illumination as claimed in claim 1, wherein the light-valving structure and the color-adjusting structure are located on a plane perpendicular to the traveling path of the light.

5. The color regulating device for illumination as claimed in claim 1, wherein the light-valving structure and the color-adjusting structure are located on a plane perpendicular to the traveling path of the light, and are adjacent to each other.

6. The color regulating device for illumination as claimed in claim 5, wherein the light-valving structure is a plane light-valving structure which is a member selected from the group consisting of a micro electro mechanical assembly, a color changing glass, an electronic paper, an electrowetting element, a liquid crystal layer structure and combination thereof; or a three-dimensional light-valving structure comprising a plurality of the members.

7. The color regulating device for illumination as claimed in claim 6, wherein the liquid crystal layer structure comprises:
- a first light-permeable substrate having a first side and a second side;
- a second light-permeable substrate having a first side and a second side;
- a liquid crystal (LC) layer sandwiched between the second side of the first light-permeable substrate and the first side of the second light-permeable substrate, and having at least one liquid crystal (LC) cell capable of controlling grayscale; and
- a biasing unit applying voltage to the at least one liquid crystal cell capable of controlling grayscale.

8. The color regulating device for illumination as claimed in claim 7, wherein at least one of part of the first side of the first light-permeable substrate and part of the second side of the second light-permeable substrate has a polarizer.

9. The color regulating device for illumination as claimed in claim 1, wherein the wavelength-band converting element is a wavelength-band converting material, or a wavelength-band converting structure unit.

10. The color regulating device for illumination as claimed in claim 9, wherein the wavelength-band converting material is a first wavelength-band converting material, or a first wavelength-band converting material and a second wavelength-band converting material.

11. The color regulating device for illumination as claimed in claim 10, wherein the first wavelength-band converting material or the second wavelength-band converting material is selected from the group consisting of a phosphor, a dye and combination thereof.

12. The color regulating device for illumination as claimed in claim 11, wherein the phosphor is selected from the group of an oxide phosphor, an oxynitride phosphor, a nitride phosphor, a zinciferous compound phosphor, a semiconductor phosphor, an organic phosphor, a photoluminescence dye and combination thereof.

13. The color regulating device for illumination as claimed in claim 11, wherein the dye is an absorption type dye, a photoluminescence type dye and combination thereof.

14. The color regulating device for illumination as claimed in claim 9, wherein the wavelength-band converting structure unit is a member made of cholesteric liquid crystals, blue phase liquid crystals, holographic polymer-dispersed liquid crystals (H-PDLC), an electrowetting element, or a micro electro-mechanical assembly.

15. The color regulating device for illumination as claimed in claim 1, wherein the hybrid light has a color temperature in a black body locus in a CIE 1931 chromaticity diagram.

16. The color regulating device for illumination as claimed in claim 1, wherein the hybrid light is further mixed with at least one of other light.

17. The color regulating device for illumination as claimed in claim 1, further comprising a control element selected from the group consisting of a control circuit, a latch-type knob, a circular knob, and the combination thereof.

18. The color regulating device for illumination as claimed in claim 1, further comprising an optical diffusing member selected from the group consisting of a diffusion film, a diffusion plate, a diffusion lens and the combination thereof.

19. The color regulating device for illumination as claimed in claim 1, wherein the first light source is selected from a group consisting of a light emitting diode (LED), an incandescent lamp, a halogen lamp, sunlight, a cold-cathode fluorescent lamp (CCFL), fluorescent lamp and combination thereof.

20. The color regulating device for illumination as claimed in claim 19, wherein the LED light source is a white light LED or a blue light LED.

21. A color regulating method, comprising the steps of:
- providing a first light source for emitting a first light;
- providing a light-valving structure and adjusting a flux ratio of a first incident light to a first outgoing light of the first light interacted with the light-valving structure;
- providing a color-adjusting structure having at least one wavelength-band converting element and converting a second incident light with a first wavelength band into a second outgoing light with a second wavelength band;
- providing a second light emitted from a second light source;
- mixing the first outgoing light and the second outgoing light to form a hybrid light with a color temperature different from that of the first light; and
- mixing the hybrid light with the second light emitted from the second light source.

22. The color regulating method as claimed in claim 21, wherein the hybrid light is further mixed with a portion of the first light not interacted with the light-valving structure or color-adjusting structure.

23. The color regulating method as claimed in claim 21, wherein the light-valving structure is a member selected from the group consisting of a micro electro mechanical assembly, a color changing glass, an electronic paper, an electrowetting element, a liquid crystal layer structure and combination thereof.

24. The color regulating method as claimed in claim 21, wherein the first light is emitted from a first light source selected from a group consisting of a light emitting diode (LED), an incandescent lamp, a halogen lamp, sunlight, a cold-cathode fluorescent lamp (CCFL), fluorescent lamp and combination thereof.

25. The color regulating method as claimed in claim 24, wherein the LED light source is a white light LED or a blue light LED.

26. The color regulating method as claimed in claim 21, wherein the wavelength-band converting element is a wavelength-band converting material, or a wavelength-band converting structure unit.

27. The color regulating method as claimed in claim 26, wherein the wavelength-band converting material is selected from the group consisting of a phosphor, a dye and combination thereof.

* * * * *